United States Patent [19]

Webster

[11] 4,417,034

[45] Nov. 22, 1983

[54] LIVING POLYMERS AND PROCESS FOR THEIR PREPARATION

[75] Inventor: Owen W. Webster, Wilmington, Del.

[73] Assignee: E. I. Du Pont de Nemours & Co., Wilmington, Del.

[21] Appl. No.: 389,110

[22] Filed: Jun. 17, 1982

Related U.S. Application Data

[63] Continuation-in-part of Ser. No. 279,025, Jun. 30, 1981, abandoned.

[51] Int. Cl.$^3$ .............................................. C08F 4/16
[52] U.S. Cl. .................................... 526/190; 526/194; 526/262
[58] Field of Search ................ 526/190, 126, 194, 262

[56] References Cited

U.S. PATENT DOCUMENTS

| | | | |
|---|---|---|---|
| 3,272,786 | 9/1966 | Perry | 526/190 |
| 3,393,182 | 7/1968 | Trepka | 526/82 |
| 3,458,491 | 7/1969 | Dennis | 526/82 |
| 3,773,694 | 11/1973 | Nakata et al. | 526/190 |
| 4,011,385 | 3/1977 | Wang et al. | 526/190 |
| 4,041,227 | 8/1977 | Uraneck et al. | 526/190 |
| 4,233,231 | 11/1980 | Floyd, Jr. et al. | 260/429.7 |

FOREIGN PATENT DOCUMENTS 715583 5/1976 U.S.S.R. .
717057 10/1976 U.S.S.R. .

OTHER PUBLICATIONS

Saigo et al., Chem. Letters, 2, 163 (1976).
Saigo et al., Chem. Letters, 989 (1975).
Narasaka et al., Bull. Chem. Soc. Japan, 49 (3), 779 (1976).
Narasaka et al., Chem. Letters, 1223 (1974).
Stork et al., JACS 95, 6152 (1973).
Cunico et al., J. Org. Chem. 45, 4797 (1980).
Olofson et al., Tetrahedron Letters, 21, 819 (1980).
Gostevskii et al., J. Organometallic Chem., 187, 157 (1980).
Chan, Accounts of Chemical Research, 10, 442 (1977).
Fleming et al., J. Chem. Soc. Perkin I, 1979, 1493.
White et al., J. Chem. Soc. Perkin I, 1973, 2230.
Kuran et al., Makromol. Chem. 178, 157 and 411 (1977).
Abstract SU-715-583 Kubon Univ., Komarov et al.
Abstract SU-717-057, Kubon Univ., Komarov et al.
Abstract SU-717-058, Chernyskev.
Chem. Abstracts, vol. 96, entry 85015p, S. Igumnov et al.

Primary Examiner—Joseph L. Schofer
Assistant Examiner—Peter F. Kulkosky

[57] ABSTRACT

"Living" polymers and their preparation from acrylic-type or maleimide monomers and organosilicon, -tin or -germanium initiators.

57 Claims, No Drawings

1

LIVING POLYMERS AND PROCESS FOR THEIR PREPARATION

CROSS-REFERENCE TO RELATED APPLICATION

This is a continuation-in-part of application Ser. No. 279,025, and now abandoned filed June 30, 1981. Related subject matter is disclosed and claimed by different inventive entity in commonly assigned application Ser. No. 389,111.

DESCRIPTION

1. Technical Field

This invention relates to a process for polymerizing polar α-olefinic monomers to "living" polymers and to the "living" polymers produced by such a process.

2. Background

The 1:1 addition of α,β-unsaturated esters, ketones, and nitriles to activated "donor" compounds, for example, silicon- or tin-containing "donor" compounds, is well known. Such reactions may be referred to as Michael type addition reactions and are catalyzed by bases, such as a fluoride or cyanide, or by Lewis acids, such as zinc chloride, boron trifluoride, titanium tetrachloride, or hydrogen bromide.

K. Saigo et al., Chem. Letters, 2, 163 (1976) disclose that when methylvinyl ketone or cyclohexenone is employed as a Michael acceptor in the presence of O-silylated ketene acetals and titanium tetrachloride, the desired product is obtained in low yields and a polymeric by-product is produced. The polymer was not isolated or identified and means are disclosed for minimizing the by-product by modifying the titanium tetrachloride catalyst by including therewith tetraisopropyl titanate.

U.S.S.R. Pat. No. 717,057 discloses organosilicon acetals of the formula $$RO-CH(CH_3)-OSiR'_{3-n}(OR'')_n,$$

and their use as intermediates in the preparation of perfumes and in the production of polymers and flotation agents, wherein R is $C_3H_7$, $C_6H_5$, $CH\equiv CCH_2$, $CH\equiv CC(CH_3)_2$ or menthyl; R' is $C_{1-4}$ alkyl or $C_6H_5OCH(CH_3)$, and n is 0 or 1.

U.S.S.R. Pat. No. 715,583 discloses trimethylsiloxyethyl esters of the formula $RC(O)X-CH(CH_3)-OSi(CH_3)_3$, useful as intermediates in the manufacture of medicinals, plasticizers, and polymers, and as agricultural pesticides and perfumes and in food manufacture, wherein X is oxygen or sulfur and R is lower alkyl, chloroalkyl or optionally substituted alkenyl.

Stork et al., JACS 95, 6152 (1973) disclose the use of α-silylated vinyl ketones to prevent the polymerization of simple alkyl vinyl ketones via their enolate ions during Michael addition reactions.

The use of trialkylsilyl groups as temporary protectants for hydroxyl functions, removal by subsequent hydrolysis, is well known in the art, for example, Cunico et al., J. Org. Chem. 45, 4797, (1980).

DISCLOSURE OF THE INVENTION

For further comprehension of the invention, and of the objects and advantages thereof, reference may be made to the following description and to the appended claims in which the various novel features of the invention are more particularly set forth.

The invention resides in the process of polymerizing the monomer selected from the group consisting of $$CH_2=C(Y)X, \quad O=C\underset{\underset{R}{N}}{\overset{CH=CH}{\diagup\diagdown}}C=O$$

and mixtures thereof
wherein:

X is $-CN$, $-CH=CHC(O)X'$ or $-C(O)X'$;

Y is $-H$, $-CH_3$, $-CN$ or $-CO_2R$, provided, however, when X is $-CH=CHC(O)X'$, Y is $-H$ or $-CH_3$;

X' is $-OSi(R^1)_3$, $-R$, $-OR$ or $-NR'R''$; each $R^1$ is independently selected from $C_{1-10}$ alkyl and $C_{6-10}$ aryl or alkaryl;

R is $C_{1-20}$ alkyl, alkenyl, or alkadienyl or $C_{6-20}$ cycloalkyl, aryl, alkaryl or aralkyl, any of said groups optionally containing one or more ether oxygen atoms within aliphatic segments thereof and optionally containing one or more functional substituents that are unreactive under polymerizing conditions; and each of R' and R'' is independently selected from $C_{1-4}$ alkyl by contacting the one or more monomers under polymerizing conditions with:

(i) the initiator of the formula $(R^1)_3MZ$
wherein:

$R^1$ is as defined above;

Z is an activating substituent selected from the group consisting of $$-CN, -\underset{\underset{R^3}{|}}{\overset{R^2}{\underset{|}{C}}}-CN, -\underset{\underset{R^3}{|}}{\overset{R^2}{\underset{|}{C}}}-\overset{O}{\underset{\|}{C}}X', Z'\underset{(CH_2)_m}{\overset{\overset{O}{\|}}{\underset{|}{C}}}, \underset{(CH_2)_n}{\overset{R^2}{\underset{|}{C}}}\overset{O}{\underset{\|}{C}}-\underset{(CH_2)_n}{\overset{R^2}{\underset{|}{C}}}-,$$

$$-N=C=\overset{R^2}{\underset{|}{C}}-R^3, -OC=\underset{\underset{R^3}{|}}{\overset{\underset{|}{X'}}{C}}-R^2, -OC\underset{(CH_2)_m}{=}CR^2,$$

$$-OC\underset{(CH_2)_n}{=}CR^2 \quad \text{and mixtures thereof}$$

wherein:

X' is as defined above for the monomer; each of $R^2$ and $R^3$ is independently selected from H; $C_{1-10}$ alkyl and alkenyl; $C_{6-10}$ aryl, alkaryl, and aralkyl; any of said groups except H optionally containing one or more ether oxygen atoms within aliphatic segments thereof and optionally containing one or more functional substituents that are unreactive under polymerizing conditions;

Z' is O or N;

m is 2, 3 or 4;

n is 3, 4 or 5; and

M is Si, Sn, or Ge, provided, however, when Z is

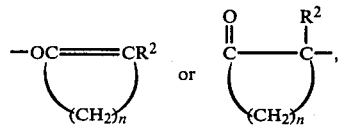

M is Sn or Ge; and (ii) a co-catalyst which is a source of fluoride, cyanide or azide ions or a suitable Lewis acid, for example, zinc chloride, bromide or iodide, boron trifluoride, alkylaluminum oxide or an alkylaluminum chloride, to produce "living" polymer having repeat units of the one or more monomers.

By "living" polymer is meant a polymer of the invention which contains an active terminal group and is capable of polymerizing further in the presence of monomer(s) and co-catalyst.

It has been independently discovered that bifluoride ions $HF_2^\ominus$ are also excellent co-catalysts in the process of the invention.

It will be understood by one skilled in the art that the last four members of the aforesaid group from which the activating substituent Z is selected are the respective ketene imine or enol forms of the previous four members of the group. The mixtures of such members which are operable herein include, but are not limited to, the corresponding cyano-imine or keto-enol mixtures.

The polymers produced by the process of the invention are "living" polymers of the formula

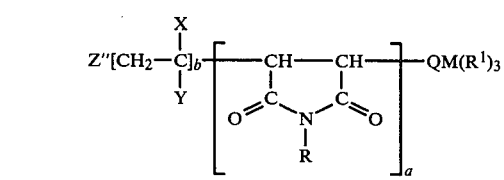

wherein:

Z" is selected from the group consisting of

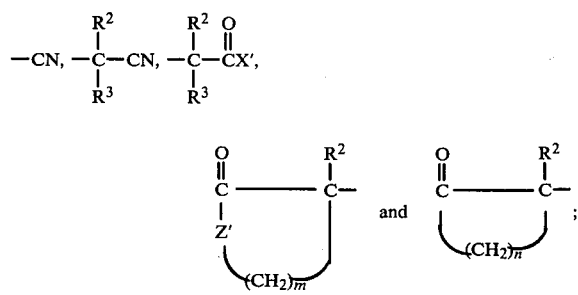

each of a and b is independently selected from 0 or a number in the range 1 to about 100,000, provided, however, (a+b) is at least 3;

Q is the divalent radical selected from the group consisting of

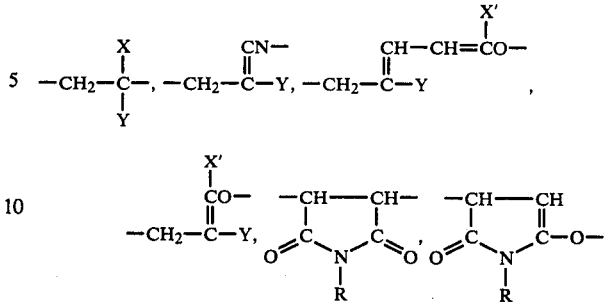

and mixture thereof; and all remaining symbols are as defined above.

It is readily apparent that the five members of the group defining Z" are the same as the first five members of the aforesaid group defining Z and are cyano or keto forms of Z. It also is apparent that Q is a "living" polymer unit provided by the starting monomers of the process of the invention, as originally depicted above, or such unit in its enol or imine form. The terminal group $—M(R^1)_3$ at the "living" end of the polymer is attached to carbon if the adjacent Q unit is in its keto form, and to a hetero atom (O or N) if the adjacent Q unit is in its enol form. Both tautomeric forms may coexist in a given "living" polymer of the invention.

The "living" polymer of the invention can be a homopolymer or a copolymer, depending on the monomer or monomers selected for use in the process of the invention. Moreover, as will be discussed more fully hereinafter, the "living" polymer can be linear or branched and, depending on the selection of X or Z" in the formula, can be used to prepare crosslinked polymers and block copolymers.

Monomers which are suitable for use in the practice of this invention are, in general, known compounds and include, but are not limited to, the following: methyl methacrylate; butyl methacrylate; sorbyl acrylate and methacrylate; lauryl methacrylate; ethyl acrylate; butyl acrylate; acrylonitrile; methacrylonitrile; 2-ethylhexyl methacrylate; 2-(dimethylamino)ethyl methacrylate; 2-(dimethylamino)ethyl acrylate; 3,3-dimethoxypropyl acrylate; 3-methacryloxypropyl acrylate; 2-acetoxyethyl methacrylate; p-tolyl methacrylate; 2,2,3,3,4,4,4-heptafluorobutyl acrylate; methylene malononitrile; ethyl 2-cyanoacrylate; N,N-dimethyl acrylamide; 4-fluorophenyl acrylate; 2-methacryloxyethyl acrylate and linoleate; propyl vinyl ketone; ethyl 2-chloroacrylate; glycidyl methacrylate; 3-methoxypropyl methacrylate; 2[(1-propenyl)oxy]ethyl methacrylate and acrylate; phenyl acrylate; 2-(trimethylsiloxy)ethyl methacrylate; allyl acrylate and methacrylate. Preferred monomers include methyl methacrylate; glycidyl methacrylate; sorbyl methacrylate; ethyl acrylate; butyl acrylate; sorbyl acrylate; 2-(trimethylsiloxy)ethyl methacrylate; 2-methacryloxyethyl acrylate; 2-acetoxyethyl methacrylate; and 2-(dimethylamino)ethyl methacrylate. Methyl methacrylate is most preferred.

As indicated above in the definition of R in the formulas for the monomer, substituents having oxygen-, nitrogen-, or silicon-containing groups which are devoid of reactive hydrogen atoms, under polymerizing conditions, are operable. Groups such as $OSi(R^1)_3$ and $CONH_2$ are nonreactive under such conditions and, therefore, can be tolerated. On the other hand, groups such as CO₂H and OH are reactive under polymerizing conditions. In order for monomers containing such groups on the R substituent to be useful in the invention process, the groups must be chemically protected, i.e. deactivated. Monomers containing such deactivated groups are useful in the preparation of polymers which, upon treatment to remove the protective group, have functional sites along the polymer chain. Monomers which contain sufficiently sterically hindered amine and alcohol groups that remain inert under reaction conditions may be used directly without deactivation.

Initiators which are useful in the invention process include, but are not limited to, the following: [(1-methoxy-2-methyl-1-propenyl)oxy]trimethylsilane; 2-(trimethylsilyl)isobutyronitrile; ethyl 2-(trimethylsilyl)acetate; methyl 2-methyl-2-(tributylstannyl)propanoate; [(2-methyl-1-cyclohexenyl)oxy]tributylstannane; trimethylsilyl nitrile; methyl 2-methyl-2-(trimethylgermanyl)propanoate; [(4,5-dihydro-2-furanyl)oxy]trimethylsilane; [(2-methyl-1-propenylidene)bis(oxy)]bis[trimethylsilane]; [(2-methyl-1-[2-(methoxymethoxy)ethoxy]-1-propenyl)oxy]trimethylsilane; methyl [(2-methyl-1-(trimethylsilyloxy)-1-propenyl)oxy]acetate; [(1-(methoxymethoxy)-2-methyl-1-propenyl)oxy]trimethylsilane; trimethyl α,α',α''-tris(trimethylsilyl)-1,3,5-benzenetriacetate; dimethyl α,α'-bis(trimethylsilyl)-1,3-benzenediacetate; [1,6-dimethoxy-1,5-hexadiene-1,6-diylbis(oxy)]bis[trimethylsaline]; [(2-ethyl-1-propoxy-1-butenyl)oxy]ethyldimethylsilane; ethyl 2-(trimethylstannyl)propanoate; [(1-cyclohexenyl)oxy]trimethylstannane; [(2-methyl-1-butenylidene)bis(oxy)]bis[trimethylsilane]; 2-(trimethylsilyl)propanenitrile; ethyl(trimethylgermanyl)acetate; [(1-((1-dec-2-enyl)oxy)-2-methyl-1-propenyl)oxy]trimethylsilane; phenyl 2-methyl-2-(tributylstannyl)propanoate; methyl 2-(triethylsilyl)acetate; dimethyl 2,5-bis(trimethylgermanyl)hexanedioate; [(2-methyl-1-cyclohexenyl)oxy]tributylstannane; [(1-methoxy-2-methyl-1-propenyl)oxy]phenyldimethylsilane; and [(2-methyl-1-[2-(trimethylsiloxy)ethoxy]-1-propenyl)oxy]trimethylsilane. Preferred initiators include [(1-methoxy-2-methyl-1-propenyl)oxy]trimethylsilane; [(2-methyl-1-propenylidene)bis(oxy)bis[trimethylsilane]; trialkylsilyl nitriles; and [(2-methyl-1-[2-(trimethylsiloxy)ethoxy]-1-propenyl)oxy]trimethylsilane. Trimethylsilyl nitrile is most preferred.

The initiators used in the invention are either known compounds or can be prepared by known methods from known starting materials. Of the initiators listed above, trimethylsilyl nitrile and ethyl trimethylsilyl acetate are commercially available. Initiators of the aforesaid formula (R¹)₃MZ wherein Z is

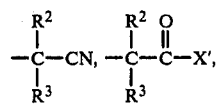

or the corresponding ketene imine or enol isomeric forms

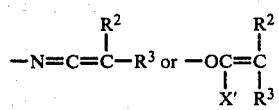

wherein X' is defined as above can be prepared from nitriles (R²)(R³)CHCN, esters, ketones, or substituted amides (R²)(R³)CHC(O)X' wherein X' is as defined above by reaction with, for example, n-butyllithium or lithium diisopropylamide, followed by reaction with a halide of the formula (R¹)₃MCl wherein R¹ and M are as defined above.

Initiators of the aforesaid formula wherein R² or R³ is CH₃ also can be prepared from the monomers using appropriate procedures. For example, CH₂=C(R³)C(O)X' can be reacted with (R¹)₃MH wherein R¹ is as defined above to produce (R¹)₃MZ wherein Z is

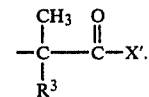

In still another method, the preferred initiators trialkylsilyl nitriles can be prepared in situ by treating a trialkylsilyl chloride with an excess of cyanide ion from a suitable source, such as tetraalkylammonium cyanide. The residual cyanide ion can serve as a co-catalyst for the polymerization.

It is to be understood that the useful initiators include nitriles, esters, amides, and ketones, and their corresponding ketene imine and enol forms, all of which are active in the polymerization process of this invention. Moreover, the initiators wherein the activating moiety Z contains R, R², and/or R³ can also have, like the monomer, one or more functional substituents attached to an aforesaid R group, provided such substituents do not interfere with polymerization. Functional substituents which are useful include, but are not limited to, —OSi(R¹)₃, —CO₂R, —OC(O)R, —NR'R", —C(O)NR'R",

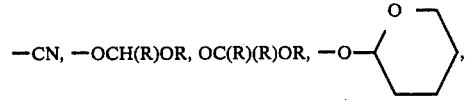

Such substituents, either directly or after treatment, for example, hydrolysis, provide functional sites along or at the end of polymer chains suitable for cross-linking, chain extension, chain branching, or for modifying properties such as water sorption, UV absorption, and the like. In the practice of this invention, as described below, an initiator moiety forms one end of a polymer chain and hence said polymers can be terminally functionalized by appropriate initiator selection and polymer treatment.

The co-catalysts used in the invention process are either known compounds or can be prepared by known methods from known compounds. Suitable, that is, effective, co-catalysts which are useful in the invention process include zinc iodide, bromide, and chloride, mono- and dialkylaluminum halides, dialkylaluminum oxides, tris(dimethylamino)sulfonium difluorotrimethylsilicate, tris(dimethylamino)sulfonium cyanide, tetrapheylarsonium cyanide, tris(dimethylamino)sulfonium azide, tetraethylammonium azide, bis(dialkylaluminum)oxides, boron trifluoride etherate, alkali metal fluorides, alkali metal cyanides, alkali metal azides, tris(dimethylamino)sulfonium difluorotriphenylstannate, tetrabutylammonium fluoride, tetramethylammonium fluoride, and tetraethylamonium cyanide. Preferred co-catalysts include sources of fluoride ions, especially tris(dimethylamino)sulfonium difluorotrimethyl silicate and tetrabutylammonium fluoride; tetraalkylammonium cyanides; zinc bromide, and zinc chloride. Other co-catalysts include the independently discovered sources of bifluoride ions, such as, for example, tris(dimethylamino)sulfonium bifluoride, tetraalkylammonium bifluorides, tetraarylphosphonium bifluorides, bifluorides of the alkali metals, especially potassium, and ammonium bifluoride. Tris(dimethylamino)sulfonium bifluoride may be prepared by reacting tris(dimethylamino)sulfonium difluorotrimethylsilicate with water or a lower alkanol, for example, methanol; water is preferred since higher yields are obtained.

The process of the invention is carried out at about −100° C. to about 150° C., preferably 0° C. to 50° C., most preferably at ambient temperature. A solvent is desirable but not essential.

Suitable solvents are aprotic liquids in which the monomer, initiator and co-catalyst are sufficiently soluble for reaction to occur; that is, the materials are dissolved at the concentrations employed. Suitable solvents include ethyl acetate, propionitrile, toluene, xylene, bromobenzene, dimethoxyethane, diethoxyethane, diethylether, tetramethylene sulfone, N,N-dimethylformamide, N,N-dimethylacetamide, N-methylpyrrolidone, anisole, 2-butoxyethoxytrimethylsilane, cellosolve acetate, crown ethers such as 18-crown-6, acetonitrile, and tetrahydrofuran. Acetonitrile and tetrahydrofuran are preferred solvents when a co-catalyst wherein the active species is an anion is used. When the co-catalyst employed is a zinc compound, suitable solvents are limited to hydrocarbons and chlorinated hydrocarbons, preferably dichloromethane or 1,2-dichloroethane. Chlorinated solvents should be avoided when other co-catalysts are employed, particularly wherein the active species is an anion. In Example 33, dichloromethane was used as solvent for such a co-catalyst resulting in a less preferred polymerization and a product having an unusually broad molecular weight distribution.

The monomers used in the process of the invention are generally liquids and can be polymerized without a solvent, although a solvent is beneficial in controlling temperature during exothermic polymerization. When a solvent is used, the monomer may be dissolved therein at concentrations of at least 1 wt %, preferably at least 10 wt %. The initiator is employed at a concentration such that the monomer/initiator molar ratio is greater than 1, preferably greater than 5. The co-catalyst is normally present in such an amount that the molar ratio of initiator to co-catalyst is in the range 0.1 to 500, preferably 1 to 10.

In the polymerization process of the invention, it is preferable to charge the initiator, co-catalyst, and solvent, if used, to the polymerization vessel before adding the monomer(s), especially if polymers of narrow molecular weight distribution are desired. In selected cases, such as the polymerization of methyl methacrylate initiated by trimethylsilyl nitrile using a relatively low concentration of cyanide or fluoride ions as the co-catalyst, polymerization takes place after an induction period of several minutes. In such cases, all materials, including the monomer(s), may be charged together or independently, and mixed in place. Such an initiator/co-catalyst system is preferred to obtain relatively monodisperse polymers. By a monodisperse polymer is meant one having a narrow molecular weight distribution, that is, $\overline{M}_w/\overline{M}_n$ is about 1. At higher values of $\overline{M}_w/\overline{M}_n$ the polymer is said by the art to be polydisperse.

Although, as indicated above, it is preferable to charge all necessary initiator, co-catalyst and solvent to the polymerization vessel before adding monomer(s), subsequent polymerization rate being controlled by monomer addition, further additions of co-catalyst may sometimes be necessary to sustain polymerization.

The final (non-living) polymeric product obtained by means of the process of the invention is formed by exposing the "living" polymer to an active hydrogen source, such as moisture or an alcohol, for example, methanol. Specific addition of a quenching reagent is recited in Examples 32, 35 and 36: methanol; and Examples 33A and B and 34 to 37: water; in the other examples, the products were exposed to moist air (generally sufficient to quench the "living" polymer).

The "living" polymers of the invention will remain "living" for substantial periods provided they are protected from active hydrogen sources such as water or alcohols. Solutions of "living" polymers in inert solvents, such as hydrocarbons, are especially useful for preserving and conveying the "living" polymers. Films and fibers of the "living" polymers may be cast or spun from such solutions, or the polymer may be isolated from solution and further processed, for example, pelletized or granulated.

It is to be understood that the final (non-living) polymeric product does not include the enol or imine species of Q in the aforesaid formula for the "living" polymer of the invention. For example (as in Examples 42 and 44), a "living" polymer prepared by polymerizing methyl methacrylate using [(1-methoxy-2-methyl-1-propenyl)oxy]trimethylsilane (MTS) as the initiator contains, at its living end, the enolic grouping

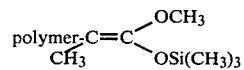

which, upon quenching, is converted to

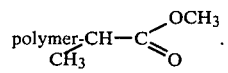

The process of the invention is useful for preparing homopolymers or copolymers of the monomers described above. In either case, the polymers obtained are "living" polymers which may be of high or low molecular weight and having a broad or narrow molecular weight distribution ($\overline{M}_w/\overline{M}_n$). At a given temperature, $\overline{M}_w/\overline{M}_n$ is primarily a function of the relative rates of initiation and polymerization. Rate of initiation, $r_i$, depends on initiator and co-catalyst type and relative concentrations. Polymerization rate, $r_p$, is a function of monomer reactivity and co-catalyst type and concentration. For monodispersity, $r_i/r_p$ is equal to or greater than 1, that is, the initiation rate is at least as fast as the polymerization rate and all chains grow simultaneously. Such conditions characterize the preparation of "living" polymers by anionic polymerization techniques of the art wherein $\overline{M}_w/\overline{M}_n$ ratios only slightly above the theoretical limit of 1 are obtainable; for example, poly(methyl methacrylate) of $\overline{M}_w/\overline{M}_n$ of about 1.01 to 1.1 are known in the art, as are copolymers of methyl methacrylate and other alkyl methacrylates. Control of $\overline{M}_w/\overline{M}_n$ permits useful variation in polymer physical properties, such as glass transition temperature, hardness, heat distortion temperature, and melt viscosity.

The polymerization process of the present invention involves a "living" mechanism having several similarities with anionic polymerization. For example, initiation and polymerization may be represented by conventional equations wherein the initiator moiety $(R^1)_3M$ is located at one end of the polymer chain which remains "living" even when the monomer supply is consumed; the activating substituent Z is located at the other end of the polymer chain. The terminal initiator moiety, unless chemically deactivated, is capable of initiating further polymerization with the same or different monomers, with resultant chain lengthening. Copolymers with specific monomer sequences, or block polymers, can thus be prepared.

Although the present process resembles anionic polymerization, there are significant differences which have commercial significance. These differences include the ability to copolymerize methacrylate and acrylate monomers, or combinations of acrylate monomers, for example, ethyl and sorbyl acrylates, to relatively monodisperse copolymers. Such copolymers are difficult or impossible to obtain by known processes such as anionic polymerization of free-radical polymerization. Moreover, whereas anionic polymerization processes which provide relatively monodisperse polymers are carried out at low temperatures, usually well below $-10°$ C., which require expensive refrigeration equipment for commercial operation, the polymerization process of the invention is operable over a wide temperature range, from about $-100°$ C. to about 150° C. It is conveniently operable with many commercially important monomers at about ambient temperatures.

The process of this invention can also be used to prepare polymers containing one or more specifically located functional groups which are useful for subsequent preparation of block copolymers or crosslinked polymers. The functional groups may be introduced by using either a monomer or an initiator, or both, containing a protected functional substituent, or by chemically deactivating (capping) the "living" end of the polymer chain with a functionalized capping agent. If the capping agent contains more than one capping site, then more than one polymer chain can be joined together to give doubled or "star" polymers. Similarly, if the initiator contains more than one initiating site, doubled or "star" polymers can be formed. Examples of monofunctional and polyfunctional capping agents include p-dimethoxymethylbenzyl bromide, p-chloromethylstyrene, p-methoxymethoxymethylbenzyl bromide, $\alpha,\alpha'$-dibromo-p-xylene, and $\alpha,\alpha'$, $\alpha''$-tribromomesitylene. Examples of initiators which can initiate more than one polymer chain include trimethyl $\alpha,\alpha'\alpha''$-tris(trimethylsilyl)-1,3,5-benzenetriacetate, dimethyl $\alpha,\alpha'$-bis(trimethylsilyl)-1,3-benzenediacetate, and 1,6-dimethoxy-1,5-hexadiene-1,6-diylbis(oxy)bis[trimethylsilane].

In the following examples of specific embodiments of this invention, parts and percentages are by weight and temperatures are in degrees Celsius unless otherwise specified. The polydispersity (D) of the polymer product of the examples is defined by $D=\overline{M}_w/\overline{M}_n$, the molecular weights being determined by gel permeation chromatography (GPC). Unless otherwise specified, the "living" polymer products obtained in the invention process were quenched by exposure to moist air before molecular weights were determined.

EXAMPLE 1

Polymerization of Methyl Methacrylate Initiated by [(1-methoxy-2-methyl-1-propenyl)oxy]trimethylsilane and BF$_3$ Etherate A solution of 50.0 ml (472 mmoles) of methyl methacryate (MMA), 5.0 ml (25 mmoles) of [(1-methoxy-2-methyl-1-propenyl)oxy]trimethylsilane (MTS), $C(CH_3)_2=C(OCH_3)(OSi[CH_3]_3)$, 5.0 ml (40 mmoles) of BF$_3$ etherate, and 50.0 ml of 1,2-dichloroethane was heated under reflux for 3.5 h. Dilution with hexane precipitated 6.21 g of poly(methyl methacrylate) (PMMA), $\overline{M}_n$ 24000, $\overline{M}_w$ 66000, D 2.75.

A control experiment with BF$_3$ etherate and MMA in 1,2-dichloroethane refluxed 3.5 h gave no PMMA precipitate with hexane.

EXAMPLE 2

Polymerization of MMA Initiated by MTS and KF

A mixture of 50.0 ml (472 mmoles) of MMA, 5.0 ml (25 mmoles) of MTS, 0.1 g of potassium fluoride, and 0.5 g of the crown ether 18-crown-6 was heated under reflux for 3 h. On dilution with hexane 8.7 g of PMMA precipitated, $\overline{M}_n$ 17000, $\overline{M}_w$ 105000, D 6.18.

EXAMPLE 3

Polymerization of Methyl Methacrylate Initiated by MTS and ZnBr$_2$

A. A mixture of 2.75 ml (26 mmoles) of MMA, 5.0 ml (25 mmoles) of MTS, 2.0 g (8.0 mmoles) of anhydrous ZnBr$_2$ and 10 ml of 1,2-dichloroethane was stirred at room temperature for 2.5 h. An NMR spectrum showed that little MMA remained and resonance peaks, consistent with the enol adducts

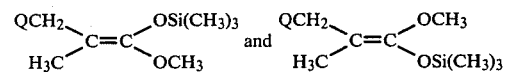

wherein Q is $C(CH_3)_2CO_2CH_3$, were present. Additional MMA (5.5 ml, 51.9 mmoles) was added and the mixture was stirred overnight. Dilution with hexane yielded 6.2 g of PMMA, $\overline{M}_n$ 600, $\overline{M}_w$ 21000, D 35.

In a similar preparation the MMA dimer was distilled and characterized, b.p. 75°–80° (0.1 mm). Anal. Calcd. for $C_{13}H_{26}O_4Si$: C, 56.9; H, 9.7. Found: C, 57.1; H, 9.5 NMR cis/trans ratio 1:2. Mass Spectrum: M/e Calcd., 274.1598. Found, 274.1596. IR: 5.78$\mu$ (C=O), 5.94 (C=C), 8.01 and 11.85 (—O—SiMe$_3$).

B. A mixture of 2.0 ml (10 mmoles) of MTS, 2.25 g (10 mmoles) of ZnBr$_2$ and 10.0 ml of dichloromethane was heated at reflux and 10.0 ml (94.4 mmoles) of MMA was added dropwise over 1 h. The reaction mixture was washed with water and the organic layer was diluted with hexane to give 10.0 g of PMMA, $\overline{M}_n$ 1100, $\overline{M}_w$ 2600, D 2.36.

C. A mixture of 2.25 g (10.0 mmoles) of ZnBr$_2$, 10.0 ml (94.4 mmoles) of MMA and 2.0 ml (10.0 mmoles) of MTS was stirred at room temperature without added solvent. An exotherm raised the temperature to 84° in 15 minutes. After cooling to room temperature the polymer mass was diluted with methylene chloride and washed with water to remove ZnBr$_2$. On concentration under vacuum, 11.0 g of PMMA remained. GPC Bimodal: 80% $\overline{M}_n$ 200, $\overline{M}_w$ 400, D 2.0; 20% $\overline{M}_n$ 12000, $\overline{M}_w$ 20000, D 1.67.

D. To 30 ml of methylene chloride under $N_2$ was added 5.7 ml of a solution of 25% diethyl zinc in toluene (10.0 mmoles). The solution was cooled to 0° and 3.19 g (20.0 mmoles) of $Br_2$ was introduced. A white precipitate of $ZnBr_2$ formed. The mixture was heated to 40° and 2.0 ml (10.0 mmoles) of MTS was added, followed by 10.0 ml (94.4 mmoles) of MMA. A 5° exotherm was noted. The reaction was stirred at 58° for 5 h. After the workup described above there was recovered 12.4 g of PMMA, $M_n$ 9600, $M_w$ 10000, D 1.04.

EXAMPLE 4

Polymerization of MMA initiated by MTS and $ZnCl_2$

A mixture of 10.0 ml (94.4 mmoles) of MMA, 2.0 ml (10 mmoles) of MTS, 1.36 g (10 mmoles) of anhydrous $ZnCl_2$ and 10.0 ml of dichloromethane was stirred at room temperature overnight. NMR showed no residual MMA. The PMMA was recovered in the usual manner. GPC: $\overline{M}_n$ 1000, $\overline{M}_w$ 35000, D 35.

EXAMPLE 5

Polymerization of MMA Initiated by MTS and $ZnI_2$

The procedure used in Example 3D was repeated with 5.08 g (20.0 mmoles) of $ZnI_2$ in place of the $ZnBr_2$. The PMMA recovered was 5.5 g, 55% yield, $\overline{M}_n$ 1200, $\overline{M}_w$ 1500, D 1.25.

EXAMPLE 6

Polymerization of MMA Initiated with Ethyl Aluminum Dichloride and MTS

Ethyl aluminum dichloride (6.49 ml of 1.54 M solution in heptane, 10.0 mmoles) was combined with 2 ml (10 mmoles) of MTS in 10 ml of dry dichloromethane at 0°. MMA (100 ml, 94.4 mmoles) was added and the solution was stirred at room temperature overnight. The solution was washed with water, then diluted with hexane to precipitate 7.3 g of PMMA, $\overline{M}_n$ 1800, $\overline{M}_w$ 3300, D 1.83.

EXAMPLE 7

Polymerization of Butyl Methacrylate Initiated by MTS and $ZnBr_2$

To a mixture of 2.0 ml (10 mmoles) of MTS and 2.25 g (10 mmoles) of $ZnBr_2$ and 10.0 ml of dichloromethane was slowly added 15.9 ml (100 mmoles) of n-butyl methacrylate. A 6° exotherm was noted. After stirring overnight the mixture was washed with water and the solvent was removed by distillation. There remained 8.0 g of poly(butyl methacrylate), $\overline{M}_n$ 8100, $\overline{M}_w$ 149000, D 18.4.

EXAMPLE 8

Polymerization of Butyl Acrylate Initiated by MTS and $ZnBr_2$

Example 7 was repeated using 100 mmoles of n-butyl acrylate in place of the n-butyl methacrylate. 9.0 Grams of poly(butyl acrylate) was isolated with an $\overline{M}_n$ of 18000, an $\overline{M}_w$ of 23000, D 1.28.

EXAMPLE 9

Polymerization of MMA with MTS/Bis(diisobutyl) Aluminum Oxide Initiator

A. To a solution of 10.0 mmoles of triisobutyl aluminum in 10 ml of dichloromethane at 0° was added 5.0 mmoles of water. The mixture was stirred 1 h at room temperature and 10.0 mmoles of MTS was added. MMA (100 mmoles) was added dropwise. A 10° exotherm was noted immediately and cooling was required to maintain the temperature at 27°–28°. The solution was stirred at 1 h, then heated at 45° for 1 h. The solution was washed with 0.1 N HCl and the solvent was removed under reduced pressure to give 9.7 g of PMMA, $\overline{M}_n$ 700, $\overline{M}_w$ 173000, D 247.

B. The experiment of Part A was repeated except that no water was added to make the oxide. 5.7 Grams of PMMA was isolated, $\overline{M}_n$ 1500, $\overline{M}_w$ 3200, D 2.13.

EXAMPLE 10

Polymerization of MMA with MTS and Diisobutyl Aluminum Chloride

To a solution of 2.0 ml (10 mmoles) of MTS, 2 ml (19 mmoles) of MMA and 30 ml of dichloromethane was added 1.95 ml (10.0 mmoles) of diisobutyl aluminum chloride at room temperature. A 4° exotherm was noted. MMA (50 ml) was then added over 1 h and the mixture was stirred an additional 5 h. The mixture was washed with water and concentrated to give 11.5 g of PMMA (21% yield), $\overline{M}_n$ 3500, $\overline{M}_w$ 8500, D 2.43.

EXAMPLE 11

Polymerization of MMA Initiated by [(1-Methoxy-2-propenyl)oxy]triethylsilane (MTES) and $ZnBr_2$ A mixture of 2.25 g (10.0 mmoles) of $ZnBr_2$, 3.2 g (10.0 mmoles) of MTES, 10 ml (94 mmoles) of MMA and 30 ml of dichloromethane was stirred at 50° for 5 h. The reaction mixture was washed with water and the organic layer was concentrated under reduced pressure to give 6.1 g (60% yield) of PMMA, $\overline{M}_n$ 300, $\overline{M}_w$ 300, D 1.0.

EXAMPLE 12

Polymerization of Ethyl Acrylate in the Presence of Methyl Methacrylate and MTS

To a stirred solution of 8.23 g (9.5 ml, 10 mmoles) of 15% diethyl zinc/toluene in 20 ml of anhydrous dichloromethane under argon at −10° was added 3.2 g (1.0 ml, 20 mmoles) of bromine, keeping the temperature below −10°. After warming to room temperature a solution of 1.74 g (2 ml, 10 mmoles) of MTS in 5.4 ml of MMA (purified by passage under argon over neutral alumina) and 5.4 ml of ethyl acrylate (purified by passage under argon over neutral alumina) was added dropwise. After a portion of the monomer-initiator solution had been added, a strongly exothermic reaction began and continued during the addition of the remainder of the monomer-initiator solution. The resulting mixture was washed with water, dried ($MgSO_4$) and evaporated under reduced pressure in a rotary evaporator. After removal of volatiles at 0.1 mm there was obtained 4 g of viscous poly(ethyl acrylate). The 90 MHz NMR spectrum of the product confirmed the absence of MMA polymer repeat units in the poly(ethyl acrylate). GPC: $\overline{M}_n$ 500, $\overline{M}_w$ 4100, D 8.2 (theor. M.W. 1000).

EXAMPLE 13

Copolymerization of Ethyl Acrylate and Sorbyl Acrylate

A. To a stirred mixture of 0.87 g (1 ml, 5 mmoles) of MTS and 0.5 ml of 1 M tris(dimethylamino)sulfonium difluorotrimethylsilicate/acetonitrile in 20 ml of anhydrous tetrahydrofuran under argon was added dropwise in a mixture of 5.4 ml (50 mmoles) of ethyl acrylate (purified by passage through neutral alumina under argon) and 6.97 g (6.8 ml, 50 mmoles) of sorbyl acrylate (prepared by Tyzor® catalyzed reaction of sorbyl alcohol with methyl acrylate) at a rate such that the temperature remained between 35° and 45°. The resulting solution was stirred for 18 h at ambient temperature and then treated with hexane, giving a precipitate of oily polymer which was washed three times with hexane and dried at 0.1 mm to give 8.5 g of polymer. To further purify the polymer and remove any unreacted monomer, the polymer was dissolved in dichloromethane, precipitated with hexane, washed with hexane, and dried at 0.1 mm. The 90 MHz NMR spectrum of the copolymer showed the absence of monomer and indicated a composition of 42 mole % sorbyl acrylate polymer repeat units and 58 mole % ethyl acrylate polymer repeat units. GPC: $\overline{M}_n$ 1500, $\overline{M}_w$ 5800, D 3.87 (theor. M.W. 2000).

B. A solution of 1 g of the copolymer of Part A and 1% (on resin) of cobalt naphthenate in a minimum of 2:2:1 ethyl acetate-cellosolve acetate-toluene was coated on glass with a 20 ml doctor knife as an air-dry finish. After 1 day the clear coating was insoluble in (but swollen by) acetone. After 5 days the coating was unaffected by rubbing with acetone, indicating that cure had occurred. After 2 weeks the Tukon hardness of the coating was measured as 12.7 Knoop.

EXAMPLE 14

Copolymerization of Methyl Methacrylate and Ethyl Acrylate with MTS and Fluoride Ion Anhydrous fluoride solution was prepared by stirring a 1 M solution of tetrabutylammonium fluoride in tetrahydrofuran (THF) with calcium hydride until hydrogen-evolution had nearly ceased. The mixture was filtered, and the filtrate was diluted with an equal volume of anhydrous THF to give a homogeneous solution of 0.5 M tetrabutylammonium fluoride.

To a stirred solution of 1 ml of 0.5 M tetrabutylammonium fluoride/THF in 20 ml of anhydrous THF at 20° under argon was added dropwise a solution of 2 g (2.3 ml, 11.4 mmoles) of MTS in 5.4 ml (50 mmoles) of MMA (purified over alumina) and 5.4 ml (50 mmoles) of ethyl acrylate (purified over alumina) during 20 min. The temperature rose to the boiling point during the addition. After the solution had cooled to room temperature, it was evaporated in vacuo. The liquid residue was dissolved in dichloromethane and washed with water, dried (MgSO$_4$), and evaporated in vacuo to give 7.6 g of liquid poly(ethyl acrylate/MMA). The NMR spectrum at 90 MHz after drying at 0.1 mm showed a polymer composition of 71 mole % ethyl acrylate polymer repeat units and 29 mole % MMA polymer repeat units. GPC: $\overline{M}_n$ 400, $\overline{M}_w$ 700, D 1.75.

EXAMPLE 15

Copolymerization of Methyl Methacrylate and Sorbyl Methacrylate

Using the procedure of Example 14 a solution of 1.74 g (10 mmoles) of dimethylketene in 4.2 g of MMA and 7 g of sorbyl methacrylate was polymerized. After washing with hexane there was obtained 3.2 g of solid poly(MMA/sorbyl methacrylate) comprised of 61 mole % and 30 mole % of the respective polymer repeat units. The composition was determined by NMR. GPC: $\overline{M}_n$ 300, $\overline{M}_w$ 1800, D 6.0. After storage for 3 weeks in air, the polymer became insoluble in acetone due to the development of crosslinks.

EXAMPLE 16

Polymerization of Methyl Methacrylate in Cellosolve Acetate Solvent (A) and Dry Air (B)

A. Using the procedure of Example 14 a solution of 0.87 g (1 ml, 5 mmoles) of MTS in 10 g (10.8 ml, 100 mmoles) of MMA was polymerized in 20 ml of cellosolve acetate, instead of THF, to give 4.6 g of PMMA, after precipitation with methanol followed by methanol-reprecipitation from dichloromethane. During the polymerization the temperature reached 85°. GPC: $\overline{M}_n$ 3900, $\overline{M}_w$ 6300, D 1.61 (theor. M.W. 2000).

B. Using the procedure of Part A, MMA was polymerized in an atmosphere of dry air, instead of argon, using 20 ml of THF, instead of cellosolve acetate, to give 11.8 g of PMMA after evaporation of the reaction mixture. GPC: $\overline{M}_n$ 1400, $\overline{M}_w$ 5100, D 3.64 (theor. M.W. 2000).

EXAMPLE 17

Copolymerization of Methyl Methacrylate and Ethyl Acrylate by Alternate Addition of Monomers To a stirred solution of 1 ml of the 0.5 M tetrabutylammonium fluoride/THF described in Example 14 and 1.74 g (2 ml, 10 mmoles) of MTS in 30 ml of anhydrous THF under argon were added five 1 g (1.08 ml, 10 mmoles) portions of ethyl acrylate (EA) and five 1 g (1.08 ml, 10 mmoles) portions of MMA in the following sequence: EA, MMA, EA, MMA, EA, EA, MMA, MMA, EA, MMA. After the addition of each portion the temperature was allowed to rise and then return to 25° before the next portion was added. The resulting solution was evaporated under reduced pressure in a rotary evaporator. The residue was dissolved in dichloromethane, washed with water, dried (MgSO$_4$), and evaporated at 0.1 mm to 9.4 g of viscous liquid copolymer. The NMR spectrum indicated the copolymeric product was comprised of 45 mole % MMA polymer repeat units and 55 mole % EA polymer repeat units. GPC: $\overline{M}_n$ 600, $\overline{M}_w$ 1200, D 2.0 (theor. M.W. 1000).

EXAMPLE 18

Polymerization of Methacrylonitrile with 2-(trimethylsilyl)isobutyronitrile and Fluoride Ion A. 2-(Trimethylsilyl)isobutyronitrile was prepared by the following procedure. To a stirred solution of 30.2 g (0.29 mole) of diisopropylamine in 220 ml of THF under argon was added at 0°-5° 184 ml of 1.58 M n-butyl lithium/hexane at a rate such that the temperature did not exceed 6°. After 15 min. 20 g (0.29 mole) of isobutyronitrile was added at 0°-5°. After 20 min., 47.3 g (0.44 mole) of chlorotrimethylsilane was added. After standing 18 h at room temperature, the mixture was filtered under argon and the filtrate was evaporated in vacuo to a solid which was extracted with ether and filtered. The filtrate was evaporated in vacuo to give 30.51 g (74%) of 2-(trimethylsilyl)isobutyronitrile as a pale yellow water-sensitive solid. Anal. Calcd. for C$_7$H$_{15}$NS: C, 59.50; H, 10.70; N, 9.92. Found: C, 59.60; H, 11.07; N, 9.74. I.R. (CCl$_4$): 2220 cm$^{-1}$ (C≡N), 847 cm$^{-1}$, 1255 cm$^{-1}$ (SiMe$_3$). NMR (90 MHz): $\delta$0.22 (9H, SiCH$_3$); $\delta$1.35 (6H, CCH$_3$).

B. To a solution of 5 ml of 2 M 2-(trimethylsilyl)isobutyronitrile/THF in 15 ml of anhydrous THF under argon was begun the dropwise addition of 6.7 g (8.32 ml, 100 mmoles) of methacrylonitrile (purified by passage over alumina under argon). No exotherm was observed during the addition of the first 0.8 ml of methacrylonitrile, so 1 ml of 0.5 M tetrabutylammonium fluoride/THF was added, whereupon the temperature rose from 20° to 35°. The solution was cooled to −70° and addition of methacrylonitrile was resumed. The resulting solution, after warming to room temperature, was evaporated in vacuo to give 5.16 g of poly(methacrylonitrile) as a yellow solid. GPC: $\overline{M}_n$ 300, $\overline{M}_w$ 3600, D 12.0 (theor. M.W. 670).

EXAMPLE 19

Polymerization of Ethyl Acrylate with Ethyl 2-(Trimethylsilyl)acetate and Fluoride Ion To a stirred solution of 1.6 g (1.8 ml, 10 mmoles) of ethyl 2-(trimethylsilyl)acetate and 2 ml of the 0.5 M tetrabutylammonium fluoride/THF described in Example 14 in 20 ml of anhydrous THF was added dropwise 10 g (10.8 ml, 100 mmoles) of ethyl acrylate (purified over alumina). The polymerization was exothermic throughout the addition period. Evaporation of the solution in vacuo gave 11.0 g of poly(ethyl acrylate). GPC: $\overline{M}_n$ 500, $\overline{M}_w$ 2000, D 4.0 (theor. M.W. 1000).

EXAMPLE 20

Polymerization of Methyl Methacrylate with MTS and Tris(dimethylamino)sulfonium Difluorotriphenyl Stannate Tris(dimethylamino)sulfonium difluorotriphenyl stannate was prepared by treating and reacting, in small portions, a mixture of dimethylaminosulfur difluoride (7.0 g, 44.5 mmoles) and ether (100 ml) with dimethylaminotriphenyl stannane (17.5 g, 44.5 mmoles) at −78°. The mixture was warmed to room temperature, stirred for 3 days and filtered under nitrogen. The white product (86% yield) melted at 138°–140° C. Structure was confirmed by NMR after recrystallization from acetone.

To a stirred solution of 276 mg (0.5 mmol) of tris(dimethylamino)sulfonium difluorotriphenyl stannate and 0.87 g (1 ml, 5 mmoles) of MTS in 20 ml of anhydrous acetonitrile under argon was added dropwise 10 g (10.8 ml, 100 mmoles) of MMA (purified over alumina). During the addition the temperature rose from 24° to 72°. Evaporation of the solution in vacuo gave 8.7 g of solid PMMA. GPC: $\overline{M}_n$ 6800, $\overline{M}_w$ 15,000, D 2.21 (theor. M.W. 2000).

EXAMPLE 21

Polymerization of Methyl Methacrylate to High Molecular Weight with MTS and Fluoride Ion A procedure similar to that of Example 19 was followed at −50° using 20 g (200 mmoles) of MMA, instead of ethyl acrylate, 0.16 ml (0.8 mmole) of MTS, instead of ethyl 2-(trimethylsilyl)acetate, 100 ml of THF, and 0.2 ml of the 0.5 M tetrabutylammonium fluoride/THF solution of Example 14. There was obtained 2.15 g of PMMA. GPC: $\overline{M}_n$ 58000, $\overline{M}_w$ 252000, D 4.34 (theor. M.W. 25000).

EXAMPLE 22

Copolymerization of Methyl Methacrylate and 2-Trimethylsiloxyethyl Methacrylate with MTS, and Conversion to Poly(methyl methacrylate/2-hydroxyethyl methacrylate)

To a stirred solution of 1.74 g (2 ml, 10 mmoles) of MTS and 1 ml of 1 M tris(dimethylamino)-sulfonium difluorotrimethylsilicate/acetonitrile in 20 ml of anhydrous THF under argon was added dropwise a mixture of 5 g (50 mmoles) of MMA and 10.1 g (50 mmoles) of 2-trimethylsiloxyethyl methacrylate (prepared by the reaction of chlorotrimethylsilane with 2-hydroxyethyl methacrylate in the presence of triethylamine). Exothermic copolymerization occurred. After stirring for 1 h at ambient temperature, 10 ml of methanol was added, and the solution was refluxed for 1 h. Evaporation in vacuo gave 12.79 g of copolymer, the NMR spectrum of which showed it to contain 11% of the residual trimethylsilyl protecting group due to incomplete methanolysis. To complete methanolysis, 6 g of the copolymer was stirred at reflux for 1 h with 20 ml of methanol, 20 ml of THF and 1 ml of 1 M tetrabutylammonium fluoride/THF. Evaporation of the solution in vacuo gave 5.6 g of poly(MMA/2-hydroxyethyl methacrylate) copolymer. GPC: $\overline{M}_n$ 1400, $\overline{M}_w$ 1500, D 1.07 (theor. M.W. 1150). 220 MHz NMR: 1:1 mole ratio of MMA and hydroxyethyl methacrylate. Hydroxyl number: 233, 246 (equivalent to 49 mole % hydroxyethyl methacrylate polymer repeat units and 51 mole % MMA polymer repeat units.

EXAMPLE 23

Polymerization of Methyl Methacrylate with Methyl 2-Methyl-2-(tributylstannyl)propanoate and Fluoride Ion A. Methyl 2-methyl-2-(tributylstannyl)propanoate was prepared by the following procedure. To a stirred solution of 17.4 g (0.1 mole) of MTS in 100 ml of anhydrous THF under argon at 0° was added 63.3 ml (0.1 mole) of 1.58 M butyl lithium/hexane at a rate such that the temperature remained near 0°. After 30 min. at 0° the solution was allowed to warm to room temperature, and 32.55 g (33.2 ml, 0.1 mole) of tributyl tin chloride was added at a rate such that the temperature remained below 30°. Lithium chloride precipitated. After 30 min. the mixture was filtered under argon, and the filtrate was distilled through a spinning band column to give 7.3 g of tetrabutyl tin, b.p. 79°–81°/0.2 mm and 22.1 g of methyl 2-methyl-2-(tributylstannyl)propanoate, b.p. 80°/0.1°–85°/0.2 and 85°–95°/0.3 mm. Anal. Calcd. for $C_{17}H_{36}O_2Sn$: C, 52.27; H, 9.29; Sn 30.25. Found: C, 52.11; H, 9.35; Sn 28.49, 28.92. Both $H^1$ and $C^{13}$ NMR showed the structure to be methyl 2-methyl-2-(tributylstannyl)propanoate with no detectable amount of the isomeric [(1-methoxy-2-methyl-1-propenyl)oxy]tributylstannane.

B. To a stirred solution of 1.95 g (5 mmoles) of methyl 2-methyl-2-(tributylstannyl)propanoate and 0.5 ml of 1 M tris(dimethylamino)sulfonium difluorotrimethylsilicate/acetonitrile in 20 ml of anhydrous THF under argon was added dropwise 10 g (10.8 ml, 100 mmoles) of MMA (purified over alumina). Exothermic polymerization caused the temperature to rise to 60°. Evaporation of the solution in vacuo gave 12.19 g of PMMA. GPC: $\overline{M}_n$ 900, $\overline{M}_w$ 14000, D 15.55 (theor. M.W. 2000).

EXAMPLE 24

Polymerization of Methyl Methacrylate with [(2-Methyl-1-cyclohexenyl)oxy]tributylstannane and Fluoride Ion Following the procedure of Example 23, but using 2 g (5 mmoles) of [(2-methyl-1-cyclohexenyl)oxy]tributylstannane (prepared by the method of Y. Odic and M. Pereyre, J. Organomet. Chem., 55, 273 (1973)) instead of methyl 2-methyl-2-(tributylstannyl)propanoate, there was obtained 9.75 g of PMMA. GPC: $\overline{M}_n$ 500, $\overline{M}_w$ 15000, D 30.0 (theor. M.W. 2000).

EXAMPLE 25

Polymerization of Methyl Methacrylate with MTS and Cyanide Ion

To a stirred solution of 0.87 g (1 ml, 5 mmoles) of MTS in 20 ml of anhydrous THF under argon was added 1 ml of 1 M tris(dimethylamino)sulfonium cyanide/acetonitrile. A precipitate formed. Then 10 g (10.8 ml, 100 mmoles) of MMA (purified over alumina) was added dropwise; the temperature rose above 50° and most of the solid dissolved. After stirring at ambient temperature for 18 h, the mixture was filtered, and the filtrate was evaporated in vacuo to give 10.8 g of PMMA. GPC: $\overline{M}_n$ 500, $\overline{M}_w$ 2200, D 4.4 (theor. M.W. 2000). 220 MHz NMR: 56% syndiotactic, 44% heterotactic.

EXAMPLE 26

Polymerization of Methyl Methacrylate with Trimethylsilyl Nitrile and Fluoride Ion or Cyanide Ion A. To a stirred solution of 0.99 L g (1.3 ml, 10 mmoles) of trimethylsilyl nitrile and 10 ml of 1 M tris(dimethylamino)sulfonium difluorotrimethylsilicate/acetonitrile in 20 ml of anhydrous acetonitrile was added 10 g (10.8 ml, 100 mmoles) of MMA (purified over alumina). No temperature rise was observed for 20 min.; then an exothermic reaction occurred which caused the solvent to reflux. Evaporation of the solution in vacuo gave 8 g of solid PMMA. GPC: $M_n$ 4600; $M_w$ 5000; D 1.09 (theor. M.W. 1000).

B. To a stirred solution of 0.99 g (1.3 ml, 10 mmoles) of trimethylsilyl nitrile in 20 ml of anhydrous acetonitrile was added 10 g (10.8 mmoles) of MMA (purified over alumina). No temperature increase was observed. After 18 h, examination of an aliquot of the solution showed no polymer to be present. Then 1 ml of 1 M tris(dimethylamino)sulfonium cyanide/acetonitrile was added. After 10 min. a slow temperature rise began. After 45 min. a strongly exothermic reaction occurred, causing a temperature rise to above 60°. After the solution had cooled to room temperature, it was evaporated in vacuo to 10.4 g of PMMA. GPC: $\overline{M}_n$ 800, $\overline{M}_w$ 800, D 1.03 (theor. M.W. 1000). 220 MHz NMR: 11% isotactic, 44% syndiotactic, 45% heterotactic.

EXAMPLE 27

Polymerization of Methyl Methacrylate with MTS and Azide Ion

To a stirred solution of 120 mg (0.75 mmole) of tris(dimethylamino)sulfonium azide and 0.87 g (1 ml, 10 mmoles) of MTS in 20 ml of anhydrous acetonitrile under argon was added dropwise 18.5 g (20 ml, 185 mmoles) of MMA (purified over alumina). No exotherm was observed; the solution was stirred 18 h at ambient temperature. Evaporation in vacuo gave 21.2 g of PMMA. GPC: $\overline{M}_n$ 3000, $\overline{M}_w$ 3100, D 1.03 (theor. M.W. 3700). NMR: equal amounts of syndiotactic and heterotactic.

EXAMPLE 28

Polymerization of Methyl Methacrylate with Methyl 2-Methyl-2-(trimethylgermanyl)propanoate and Fluoride Ion A. Methyl 2-methyl-2-(trimethylgermanyl)propanoate was prepared by the following procedure. To a stirred solution of 27.7 g (31.8 ml, 0.159 mole) of MTS in 200 ml of anhydrous THF under argon at 0° was added 100.6 ml of 1.58 M butyl lithium/hexane. The resulting solution was stirred at room temperature for 1 h and then treated dropwise with 24.38 g (0.159 mole) of trimethylgermanium chloride during 15 min. A precipitate of lithium chloride appeared. The mixture was stirred 18 h at ambient temperature, filtered under argon, and distilled in a spinning band column to give 22.9 g of methyl 2-methyl-2-(trimethylgermanyl)propanoate, b.p. 46°–49°/4.5–6 mm. Anal. Calcd. For $C_8H_{18}O_2Ge$: C, 43.91; H, 8.29. Found: 44.07; H, 8.24. 90 MHz NMR (CDCl$_3$, Ext. TMS): δ3.46 (s, 3H, OCH$_3$), δ1.09 (s, 6H, CCH$_3$), δ0.0 (s, 9H, GeCH$_3$).

B. To a stirred solution of 1.09 g (0.82 ml, 5 mmoles) of methyl 2-methyl-2-(trimethylgermanyl)propanoate and 0.5 ml of 1 M tris(dimethylamino)sulfonium difluorotrimethylsilicate in 20 ml of anhydrous acetonitrile at 0° under argon was added dropwise 10 g (10.8 ml, 100 mmoles) of MMA (purified over alumina). The rate of addition was controlled to keep the temperature from exceeding 30°. After stirring for 18 h at ambient temperature, the solution was evaporated in vacuo to give 8 g of PMMA. GPC: $\overline{M}_n$ 8500; $\overline{M}_w$ 37000; D 4.35 (theor. M.W. 2000).

EXAMPLE 29

Monodisperse Polymethylmethacrylate Using Methyl 2-Methyl-2-(trimethylgermanyl)propanoate, Trimethylsilyl Nitrile and Fluoride Ion To a stirred solution, under argon, of 1.094 g (0.82 ml, 5 mmoles) of the germanium compound of Example 28, Part A, 0.5 ml of 1 M tris(dimethylamino)sulfonium difluorotrimethylsilicate, and 0.39 g (0.5 ml, 3.9 mmoles) of trimethylsilyl nitrile in 20 ml of anhydrous acetonitrile at 0° was added 10 g (10.8 ml, 100 mmoles) of MMA (purified over alumina). No exotherm was observed, so the solution was stirred at 20° for 18 h. Evaporation in vacuo gave 9.4 g of PMMA. GPC: $\overline{M}_n$ 1300, $\overline{M}_w$ 1300, D 1.00 (theor. M.W., based on initiation by both Ge and Si, 1123).

EXAMPLE 30

Polymerization of Methyl Methacrylate with Chlorotrimethylsilane and Cyanide Ion To a solution of 0.54 g (0.6 ml, 5 mmoles) of chlorotrimethylsilane and 14 ml (7 mmoles) of 0.5 M tetraethylammonium cyanide/acetonitrile in 6 ml of anhydrous acetonitrile was added 10 g (10.8 ml, 100 mmoles) of purified methyl methacrylate. After about 20 min. an exothermic reaction occurred causing vigorous boiling of the solvent. Evaporation of the solution in vacuo gave 9.4 g of PMMA. GPC: $\overline{M}_n$ 3100, $\overline{M}_w$ 3300, D 1.06 (theor. M.W. 2000).

EXAMPLE 31

Copolymerization of Methyl Methacrylate and Glycidyl Methacrylate Using MTS and Fluoride Ion To a stirred solution of 0.87 g (1 ml, 5 mmoles) of MTS and 0.5 ml of 1 M tris(dimethylamino)sulfonium difluorotrimethylsilicate/acetonitrile in 20 ml of anhydrous THF under argon at 0° was added dropwise a mixture of 5 g (5.4 ml, 50 mmoles) of MMA (purified over alumina) and 7.1 g (50 mmoles) of glycidyl methacrylate (purified over alumina). The temperature was maintained between −1° and 7° during the addition of monomers. After stirring for 30 min. at room temperature the viscous solution was added to hexane, and the precipitated polymer was collected by filtration and dried to give 14.45 g of poly(MMA/glycidyl methacrylate) copolymer. GPC: $\overline{M}_n$ 4200, $\overline{M}_w$ 7800, D=1.86 (theor. M.W. 2400). 90 MHz NMR: 1.3 MMA/1 glycidyl methacrylate.

EXAMPLE 32

Polymerization of N,N-Dimethyl Methacrylamide with Ethyl 2-(Trimethylsilyl)acetate and Fluoride Ion To a stirred solution of 0.8 g (0.9 ml, 5 mmoles) of ethyl 2-(trimethylsilyl)acetate and 0.5 ml of 1 M tris(dimethylamino)sulfonium difluorotrimethylsilicate/acetonitrile in 20 ml of anhydrous THF under argon was added 11.3 g (100 mmoles) of N,N-dimethyl methacrylamide with cooling in a bath. During the addition the temperature fluctuated between −3° and 46° due to the exothermic reaction. After stirring for 3 min. at room temperature, 2 ml of methanol was added, and the solution was evaporated in vacuo to give 11.3 g of solid poly(N,N-dimethyl methacrylamide).

EXAMPLE 33

Polymerization of Methyl Methacrylate with [(4,5-Dihydro-2-furanyl)oxy]trimethylsilane and Fluoride Ion A. To [(4,5-dihydro-2-furanyl)oxy]trimethylsilane (0.61 g, 3.79 mmoles; C. Ainsworth, F. Chen, and Y.-N.Kuo, J. Organomet. Chem., 46, 59 (1972)) and MMA (2 ml) at −40° was added tris(dimethylamino)sulfonium difluorotrimethylsilicate (0.61 g, 2.22 mmoles; U.S. Pat. No. 3,940,402), dissolved in 1 ml of methylene chloride, and 1 ml of MMA, dropwise. The mixture was warmed to room temperature in about 20 min. and excess water, about 20 ml, and saturated sodium bicarbonate, about 20 ml, were added; the product was extracted with methylene chloride (50 ml and 20 ml portions). The dried methylene chloride layer was concentrated to yield 2.60 g of white amorphous PMMA powder (92.5%). GPC: $\overline{M}_n$ 2600, $\overline{M}_w$ 21000, D 8.08. NMR: 15% isotactic, 47% heterotactic, 38% syndiotactic.

B. To tris(dimethylamino)sulfonium difluorotrimethylsilicate (0.090 g, 0.33 mmole) in 10 ml of anhydrous THF was added [(4,5-dihydro-2-furanyl)oxy]trimethylsilane (50 μl, 0.30 mmole) and then MMA (7 ml, 65.4 mmoles) at −78°. The mixture was warmed to −40° and further stirred for 2 h. Twenty ml of saturated ammonium chloride was added and the mixture was further stirred for 10 min. The product was extracted twice with 100 ml of methylene chloride. The methylene chloride layers were combined, dried and concentrated. The colorless white solid PMMA (6.149 g, 94%) so obtained was analyzed by GPC and NMR. The PMMA was of unusually high molecular weight. GPC: $\overline{M}_n$ 25000, $\overline{M}_w$ 250000, D 10.00. NMR 5% isotactic, 35% heterotactic, 60% syndiotactic.

C. PMMA was prepared as in Parts A and B except that acetonitrile was used as solvent; $\overline{M}_n$ 2100; $\overline{M}_w$ 2400; D 1.14.

EXAMPLE 34

Polymerization of Methyl 1,3-Pentadienoate with [(4,5-Dihydro-2-furanyl)oxy]trimethylsilane and Fluoride Ion To tris(dimethylamino)sulfonium difluorotrimethylsilicate (0.070 g, 0.25 mmole) in 15 ml of anhydrous THF was added a mixture of methyl 1,3-pentadienoate (1 ml) and [(4,5-dihydro-2-furanyl)oxy]trimethylsilane (50 μl, 0.25 mmole) in 10 min. at −78°. An additional 2 ml of the ester was added and the mixture was stirred for 17 h at −78°. It was subsequently warmed to −40°. The product was added to excess hexane and water. The aqueous layer was extracted with methylene chloride and the combined extract was dried. Removal of solvent yielded a colorless waxy solid poly(methyl 1,3-pentadienoate) (1.03 g, 35.6%). GPC: $\overline{M}_n$ 10000, $\overline{M}_w$ 22000, D 2.2

EXAMPLE 35

Preparation of Monohydroxy Poly(methyl methacrylate)

To a stirred solution of 1.30 g (4.7 mmoles) of [(2-methyl-1-[2-(trimethylsiloxy)ethoxy]-1-propenyl)oxy]-trimethylsilane, $C(CH_3)_2=C(OSi[CH_3]_3)(OCH_2CH_2OSi[CH_3]_3)$, and 0.17 g (0.6 mmole) of tris(dimethylamino)sulfonium difluorotrimethylsilicate in 10 ml of anhydrous THF under nitrogen at 25° was added, all at once, 0.5 g (5.0 mmoles) of MMA (purified over alumina). The temperature rose from 25° to 31° and the solution was stirred for 15 min. A second portion of MMA, 5.0 g in 5 ml of THF, was added dropwise over 17 min. while the temperature rose from 26° to 48°. After stirring for an additional 30 min. a third portion of MMA, 4.5 g in 5 ml of THF, was added over 20 min. After the temperature, which rose from 26° to 41°, dropped to about 23° C., the solution was stirred for 30 min. (the reaction mixture gradually became viscous) and then quenched with 5 ml of methanol. The solvents were evaporated in vacuo to give a white foamy residue which was dried at 25° and 0.05 mm Hg for 18 h and weighed. (Crude yield 12.5 g.) This was dissolved in 20 ml of THF and added dropwise to 800 ml of n-hexane. The precipitate was collected by filtration and weighed (10.2 g). HPLC (LiChrosorb Si 60, 3.2×250 mm; ethyl acetate; 1.0 ml/min; 1250–1300 psi, 1.7–9 MPa). Retention volume (Rv): $Rv_1=1.46$; (identified by $^1$H NMR (220 MHz, CDCl$_3$/external trimethylsiloxy) to be trimethylsiloxy-protected PMMA); $Rv_2=1.86$; identified by HPLC to be free HO-ended PMMA by comparison with authentic sample made by anionic polymerization. GPC: $\overline{M}_n=5100$, $\overline{M}_w=5500$, D=1.08.

Hydrolysis of the trimethylsilyl group to give free monohydroxy PMMA was accomplished by the following procedure. To a stirred solution under nitrogen of 5.0 g of TMS-protected polymer in 30 ml of THF was added 3 ml of 1 M Bu$_4$NF in THF. The resulting solution was refluxed for 1 h, cooled to 25°, and quenched with 5 ml of methanol containing a few drops of water. The solvents were evaporated and the residue was dissolved in 100 ml of methylene chloride. After washing successively with 100 ml portions of water and brine the organic layer was dried (MgSO$_4$) and evaporated to give 4.6 g of solid polymer. Precipitation once from n-hexane gave 4.2 g of the desired free monohydroxy PMMA. NMR, HPLC and GPC analysis confirmed the structure.

EXAMPLE 36

Poly(2-Methacryloxyethyl Acrylate)

To a solution of 10 ml of 1 M (diethylzinc/methylene chloride in 10 ml of anhydrous methylene chloride at −10° was added 3.2 g (1.0 ml) of bromine. The mixture was warmed to room temperature and 2 ml (10 mmoles) of MTS was added. Then 18.4 g (17 ml, 100 mmoles) of 2-methacryloxyethyl acrylate (purified over Al$_2$O$_3$ under argon) was added dropwise at a rate such that the temperature remained between 25° and 40°. The exotherm persisted throughout the monomer addition. Then, 2 ml of methanol was added and the mixture was washed with water, dried (MgSO$_4$) and evaporated to 15 g of oil. The NMR spectrum of the crude product showed unpolymerized monomer present. The crude product was dissolved in methylene chloride and added to hexane to give a precipitate of 2 g of viscous amber poly(2-methacryloxyethyl)acrylate. The NMR spectrum of the polymer showed monomeric methacrylate pendant groups, and no unpolymerized acrylate. GPC: $\overline{M}_n$ 1600, $\overline{M}_w$ 2600, D. 1.63 (theor. MW 1940).

EXAMPLE 37

Monocarboxyl PMMA and α,ω-Dicarboxy PMMA

To a solution of 960 mg (5 mmoles) of [(2-methyl-1-propenylidene)bis(oxy)]-bis[trimethylsilane] in 5 ml of THF was added 0.5 ml of a 1 M solution of tris(dimethylamino)sulfoniumdifluorotrimethylsilicate (TASF) in acetonitrile. Then 10 g (100 mmoles) of MMA in 5 ml of THF was added at 0° with stirring under argon. The solution was allowed to warm to 25°, stirred for 30 min and then divided into two parts. To one part (15.5 ml) was added 5 ml of 1 M TASF in acetonitrile. This was stirred at 25° for 15 min, hydrolyzed with 1 ml of 6 N hydrochloric acid and then concentrated by evaporation. The residue was dissolved in 100 ml of dichloromethane, washed with 100 ml of water, dried (MgSO$_4$), filtered and evaporated to give 5.3 g of monocarboxyl PMMA. To the second part was added 2.5 ml of 1 M TASF in acetonitrile at −32°. Then 0.8 g of α,ω′-dibromo-p-xylene in 4 ml of THF was added over a 10 min period. After allowing the reaction to warm to 25° and stirring for an additional one hour, 1.0 ml of 6 N HCl was added. The solvents were evaporated and the residue was dissolved in 20 ml of acetone and precipitated from hexane to give 4.7 g of α,ω-dicarboxyl PMMA. GPC analysis gave for the monocarboxyl PMMA: $\overline{M}_n$ 2300, $\overline{M}_w$ 2700, D 1.17; and for the α,ω-dicarboxyl PMMA: $\overline{M}_n$ 3700, $\overline{M}_w$ 4600, D 1.24.

EXAMPLE 38

Copolymerization of Methyl Methacrylate and Hexamethylene Diacrylate

This example demonstrates the conversion of a difunctional monomer to a difunctional initiator with Me$_3$SiCN and subsequent polymerization of MMA to give a "double-ended" polymer, taking advantage of the faster reaction of acrylates than methacrylates.

To a stirred solution, under argon, of 0.64 ml (5 mmol) of trimethylsilyl nitrile and 0.5 ml of 1 M tetraethylammonium cyanide/acetonitrile in 20 ml of acetonitrile was added simultaneously 10.8 ml (100 mmol) of methyl methacrylate and 0.566 g (2.5 mmol) of hexamethylene diacrylate. The temperature gradually rose from 21° to 23.6° during 20 min and then receded. After 60 min an exotherm occurred, causing the temperature to rise to 42° during 10 min and then recede. The solution remained clear and relatively nonviscous, indicating that crosslinking did not occur. After a total time of 2 h, 2 ml of methanol was added to remove the trimethylsilyl end groups, and the solution was evaporated in vacuo to 10.8 g of solid poly(methyl methacrylate). GPC: $\overline{M}_n$ 3900, $\overline{M}_w$ 4900, D 1.25 (theor. $\overline{M}_w$ 4278).

EXAMPLE 39

Poly(Methyl Methacrylate)/Polycaprolactone/Poly(Methyl Methacrylate) ABA Block Copolymer This exaple demonstrates the preparation of the diacrylate of α,ω-polycaprolactone diol, conversion of the diacrylate to a difunctional initiator with Me$_3$SiCN, and polymerization of MMA onto the ends. The polycaprolactone provides a soft segment, and the poly(MMA) provides hard segments.

Polycaprolactone α,ω-diacrylate was prepared as follows. A solution of 50 g of commercial polycaprolactone α,ω-diol (M.W.∼1000) in 300 ml of toluene was refluxed under a Dean and Stark water separator for 18 h. Then, 20 ml (150 mmol) of triethylamine was added, and 10.2 g (9.1 ml, 110 mmol) of 98% acrylyl chloride was added at a rate so as to keep the temperature from exceeding 50°. After stirring for 30 min at 50°, the solution was cooled and filtered under argon. The solution was concentrated in vacuo and then passed over a column of neutral alumina under argon. The NMR spectrum of the resulting solution (230 g) showed 67.6% by weight of polycaprolactone diacrylate and 32.4% toluene, with a formula weight of 992. GPC: $\overline{M}_n$ 1250, $\overline{M}_w$ 2200, D 1.76.

To a solution of 0.6 g (0.75 ml, 6.04 mmol) of trimethylsilyl nitrile and 0.5 ml of 1 M tetraethylammonium cyanide/acetonitrile in 20 ml of acetonitrile, under argon, was added 4.44 g (3.02 mmol) of 67.6% caprolactone diacrylate. After 20 min, 10.8 ml (100 mmol) of methyl methacrylate was added. An exotherm occurred 90 min after addition of the methyl methacrylate. After 18 h, 2 ml of methanol was added, and the solution was evaporated in vacuo to 13.5 g of solid polymer. GPC: $\overline{M}_n$ 4120, $\overline{M}_w$ 7340, D 1.78 (theor. $\overline{M}_w$ 4303). NMR shows 4.24 methyl methacrylate units/caprolactone unit (theor. 4.36).

EXAMPLE 40

Polymerization of Butyl Acrylate to Narrow Molecular Weight Distribution Polymer with Diisobutylaluminum Chloride and MTS This example demonstrates the formation of substantially monodisperse polyacrylate.

To a solution of 0.87 g (1 ml, 5 mmol) of MTS in 20 ml of methylene chloride at −78°, under argon, was added 0.21 ml (1 mmol) of diisobutylaluminum chloride. Then, 12.8 g (14.3 ml, 100 mmol) of n-butyl acrylate was added at a rate so that the temperature did not exceed −70°. The exothermic reaction persisted throughout the addition of monomer. The solution was warmed to room temperature, stirred for 1 h, and then 1.3 ml of butyl acrylate was added, causing no temperature rise, indicating that the polymer which was "living" at low temperature had become deactivated toward further addition of monomer at room temperature. Methanol (1 ml) was added, and the solution was evaporated in vacuo to give 13.8 g of poly(butyl acrylate). GPC: $\overline{M}_n$ 2370, $\overline{M}_w$ 2250, D 1.06 (theor. $\overline{M}_w$ 2660).

EXAMPLE 41

Polymerization of Methyl Methacrylate

This example illustrates the preparation of "living" polymer which can be further polymerized after 20 h. Polymerization is initiated by MTS in the presence of tetraethylammonium cyanide.

Moisture-free tetraethylammonium cyanide (TEAC) (16 mg, 0.1 mmol) was transferred to a reactor via a dry-box. Under argon, tetrahydrofuran (20 ml), acetonitrile (2 ml), MTS (2.0 ml, 10 mmol) and MMA (3.0 ml, 28 mmol) were added to the reactor. Temperature rose rapidly to 52.6°. The reaction mixture was allowed to cool to 21.8° and stirred for 45 min. More MMA (3.6 ml, 34 mmol) was added and the temperature rose to 40.4°. The solution turned slightly amber. After allowing the reaction mixture to cool and stirring for 30 min, a third portion of MMA (4.0 ml, 38 mmol) was added. After an exotherm to 42.6° had subsided, the mixture was stirred for 18 h. A final addition of MMA (5.0 ml, 47 mmol) was then added and the temperature rose from 21.8° to 31.2°. The solution was stirred for 6 h, methanol was added, and the mixture was then evaporated, yielding a residue of 16.1 g of poly(methyl methacrylate). GPC: $\overline{M}_n$ 728, $\overline{M}_w$ 1570, D 2.15 (theor. $\overline{M}_w$ 1574).

EXAMPLE 42

Polymerization of Methyl Methacrylate and Isolation of Trimethoxysiloxy-ended Polymer This example demonstrates, by means of carbon-13 NMR analysis, the presence of silylenolate terminal groups in a "living" polymer prepared by the process of this invention, said polymer being isolatable as a solid without loss of activity.

A. Tetraethylammonium cyanide (16 mg, 0.1 mmol) in a reactor was heated gently under vacuum to 200° to remove moisture. After cooling under argon, tetrahydrofuran (THF) (20 ml) and MTS (2.0 ml, 10 mmol) were added to the reactor. MMA (10.6 ml, 100 mmol) was added dropwise over 30 min, during which time the temperature rose to 55.4'. The reaction mixture was allowed to cool to 22° and solvent was removed under vacuum while the reactor was maintained at about 25°. The white residue which resulted was transferred into a dry-box. An 800 mg sample was removed, dissolved in deuterochloroform (CDCl₃, 3 ml) and analyzed by C-13 NMR; 0.6 g of the residue was analyzed by GPC. GPC: $\overline{M}_n$ 777, $\overline{M}_w$ 1010, D 1.30 (theor. $\overline{M}_w$ 1102). C-13 NMR: C-13 shielding peaks as follows:

| Peak (ppm) | Assignment |
|---|---|
| 151.99 | C-1 |
| 89.78 | C-2 |
| 54.28 | C-3 |
| 29.56 | C-4 |
| 55.42 | C-5 |
| −0.11 | C-6 |

-continued

| Peak (ppm) | Assignment |
|---|---|

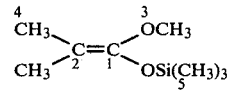

In the above formula for the polymer, n is about 9. The remaining shielding peaks corresponding to carbon atoms of the polymer are consistent with published C-13 NMR spectra of poly(methyl methacrylate) (J. Schaefer, Macromolecules 10, 384 (1977); J. C. Randall, "Polymer Sequence Determination, Carbon 13 NMR Method," Academic Press, New York, 1977). The above assignments for the terminal group in the polymer are consistent with the C-13 NMR spectrum of MTS:

| Peak (ppm) | Asssignment |
|---|---|
| 149.50 | C-1 |
| 90.40 | C-2 |
| 56.17 | C-3 |
| 16.61, 15.84 | C-4 |
| −0.20 | C-5 |

$$\begin{array}{c}\overset{4}{CH_3}\\ \overset{}{CH_3}\end{array}\overset{}{\underset{2}{C}}=\overset{}{\underset{1}{C}}\begin{array}{c}\overset{3}{OCH_3}\\ \overset{}{OSi(\underset{5}{C}H_3)_3}\end{array}$$

B. The polymer prepared and analyzed in Part A was determined to be "living" in the following manner. The remaining polymer from Part A not used for analysis was returned to the reactor. Under argon, THF (20 ml) was added, with stirring, to dissolve the polymer and MMA (10 ml, 94 mmol) was added. The temperature, originally 19°, rose to 29.4°, indicating that further polymerization was effected with the "living" polymer and fresh monomer. The mixture was stirred for 3 h, quenched with methanol (10 ml) and evaporated, yielding 22.65 g of polymer. GPC: $\overline{M}_n$ 1430, $\overline{M}_w$ 1900, D 1.32 (theor. $\overline{M}_w$ 2042).

EXAMPLE 43

Polymerization of Methyl Methacrylate With MTS and Bifluoride Ion

This example illustrates the preparation of "living" polymers which can further polymerize after more than 20 h. Polymerization is initiated by MTS in the presence of bifluoride ions as co-catalyst.

A. To a stirred suspension of 7.8 mg (0.1 mmol) of commercial potassium bifluoride (Alfa) in 20 ml of acetonitrile (distilled from CaH₂) under argon was added MTS (2.0 ml, 10 mmol). After stirring for 15 min MMA (21.5 ml, 202 mmol) was added. The mixture was stirred for 2 h, after which the temperature rose to 32° from 24°. The reaction temperature was allowed to drop to 25.5° and more MMA (5 ml, 47 mmols) was added, whereupon the temperature rose again to 32.8° over a 15 min period before falling to room temperature. The mixture was stirred at room temperature overnight under argon, after which more MMA (16.6 ml, 156 mmol) was added. An exotherm of 10° was observed.

The reaction mixture was allowed to cool to 22°, followed by addition of 10 ml of methanol. Evaporation in vacuo of the solvents gave 42.4 g of poly(methyl methacrylate). GPC: $\overline{M}_n$ 4100, $\overline{M}_w$ 5150, D 1.26 (theor. $\overline{M}_w$ 4152).

B. To a suspension of 283 mg (1.39 mmol) of tris(dimethylamino)sulfonium bifluoride in 20 ml of anhydrous THF was added 1.7 ml (8.5 mmol) of MTS, under argon. The suspension was stirred for 80 min. Then, 4.2 ml (39.5 mmol) of MMA was added. Exothermic reaction caused the temperature to rise from 23° to 58°. When the mixture had cooled to 23°, an additional 5 ml (47 mmol) of MMA was added, causing the temperature to rise to 40°. The reaction mixture was stirred for 2 h and an additional 5 ml (47 mmol) of MMA was added, producing at 29° exotherm. The mixture was cooled to −78°, stirred for 30 min and then allowed to warm to 23°. After stirring for 1 h, an additional 5 ml (47 mmol) of MMA was added. A 31° exotherm (23° to 54°) was obtained. The mixture was stirred overnight and 19 ml (179 mmol) of MMA was added. The temperature rose to 60°. After cooling to room temperature the reaction was quenched by adding 10 ml of methanol; solvent was evaporated to give 36 g of poly(methyl methacrylate). GPC: $\overline{M}_n$ 4300, $\overline{M}_w$ 5300, D 1.24 (theor. $\overline{M}_w$ 4331).

EXAMPLE 44

Polymerization of Methyl Methacrylate and Isolation of Trimethylsiloxy-ended Polymer This example demonstrates by means of carbon-13 NMR analysis the presence of silylenolate terminal groups in a "living" polymer prepared by the process of this invention.

A. To a suspension of 20 mg (0.1 mmol) of tris(dimethylamino)sulfonium bifluoride in 5 ml of THF was added, under argon, 1.0 ml (5 mmol) of MTS. Then, 2.7 ml (25 mmol) of MMA was added, whereupon the temperature rose from 22° to 50°. The mixture was stirred until the temperature dropped to 22°. Then, the reaction vessel was connected to a vacuum pump and the solvents were removed at 0.1 mm Hg using a liquid nitrogen trap. A foamy polymer, 3.5 g, was obtained. This was subjected to C-13 NMR analysis.

MTS was used as a standard and the assignment of peaks is shown below:

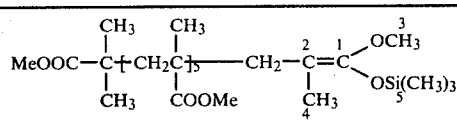

| Carbon | C-13 Shielding (ppm) |
|---|---|
| C-1 | 149.50 |
| C-2 | 90.40 |
| C-3 | 56.17 |
| C-4 | 16.61, 15.84 |
| C-5 | −0.20 |

The most distinct and useful peaks are those corresponding to the $sp^2$-hybridized carbon atoms occurring at 90.40 and 149.50 ppm. The absorption of the corresponding carbon atoms of the "living" polymer should occur in about the same spectral region.

$$\text{MeOOC}-\overset{CH_3}{\underset{CH_3}{C}}+\overset{CH_3}{\underset{COOMe}{CH_2C}}\underset{}{\overset{}{]_{\overline{5}}}}-CH_2-\overset{3}{\underset{CH_3}{C}}=\overset{2\ 1}{\underset{}{C}}\overset{OCH_3}{\underset{OSi(CH_3)_3}{}}$$

| Carbon | C-13 Shielding (ppm) |
|---|---|
| C-1 | 151.1 |
| C-2 | 88.5 |
| C-3 | 59.6 |
| C-4 | 28.1 |
| C-5 | −1 to −1.5 |

As shown above, distinct peaks occurred at 151.1 and 88.5 ppm, corresponding to the carbon atoms of the C=C moiety. The C=O absorption of the ester groups of the polymer occurred between 175 and 176 ppm as multiplets. Integration of the peaks due to C=O versus those due to C=C gave a degree of polymerization of about 6. The isolated polymer (3.5 g) was dissolved in 10 ml of THF and then treated with 5 ml of methanol. Upon evaporation and drying, 3.3 g of polymer was obtained. GPC: $\overline{M}_n$ 550, $\overline{M}_2$ 600, D 1.09 (theor. $\overline{M}_2$ 602).

B. Following the procedure of Part A, trimethylsiloxy-ended poly(ethyl acrylate) was isolated from the reaction of 20 mg (0.1 mmol) of tris(dimethylamino)sulfonium bifluoride, 1.0 ml of MTS, and 2.7 ml of ethyl acrylate in 5 ml of THF. The assignment of peaks in the C-13 NMR is shown below:

$$\underset{\text{Model}}{\overset{CH_3}{\underset{H}{\phantom{x}}}\overset{}{\underset{2}{C}}=\overset{}{\underset{1}{C}}\overset{OSiMe_3}{\underset{OEt}{}}} \qquad \underset{\text{"Living" poly(ethyl acrylate)}}{\overset{polymer-CH_2}{\underset{H}{\phantom{x}}}\overset{}{\underset{2}{C}}=\overset{}{\underset{1}{C}}\overset{OSiMe_3}{\underset{OEt}{}}}$$

| Carbon | C-13 Shieldings (ppm) | |
|---|---|---|
| | Model | Living PEA |
| C-1 | 164.2 | 167.2 |
| C-2 | 107.2 | 108.8 |

EXAMPLE 45

Polymerization of Methyl Methacrylate With a Silane and Bifluoride Ion

To a suspension of 78 mg (1.0 mmol) of potassium bifluoride in 100 ml of anhydrous acetonitrile was added [(2-methyl-1-[2-(trimethylsiloxy)ethoxy]-1-propoenyl)oxy]trimethylsilane (1.38 g, 5 mmol), with stirring, under argon. Then, 106 ml (1.0 mol) of MMA was added. The mixture was stirred at room temperature for 18 h, followed by addition of 20 ml of methanol. The solution was added to 3 l of hexane and 99.5 g of polymer was recovered. GPC: $\overline{M}_n$ 18000, $\overline{M}_w$ 21400, D 1.18 (theor. $\overline{M}_w$ 20,132).

EXAMPLE 46

Polymerization of Methyl Methacrylate/n-Butyl Methacrylate With a Silane and Bifluoride Ion To a suspension of 20 mg (0.1 mmol) of tris(dimethylamino)sulfonium bifluoride in 100 ml of anhydrous THF (distilled from sodium benzophenone ketyl radical) was added 1.38 g (5.0 mmol) of [(2-methyl-1-[2-(trimethylsiloxy)ethoxy]-1-propenyl)oxy]trimethylsilane, under argon. Then, 16.9 g (168.8 mmol) of MMA and 24.0 g (168.8 mmol) of butyl methacrylate were added simultaneously through syringe pumps over 20 min. The temperature rose to 67.4° from 21.2°, accompanied by an increase in the viscosity of the solution. An aliquot (10 g) of the solution was removed and evaporated and the residue was weighed (3.27 g) to determine the concentration of solids (% solids). The rest of the solution was evaporated and the residue was dried at 0.1 mm Hg for 48 h at 25° to give 39.2 g of polymer. $^1$H NMR (220 Hz) analysis gave the polymer composition as 50% MMA and 50% BMA. GPC: $\overline{M}_n$ 9310, $\overline{M}_w$ 9890, D 1.06, Tg 40° (theor. $\overline{M}_w$ 8302).

EXAMPLE 47

Preparation of Monodisperse High Molecular Weight Poly(Methyl Methacrylate/n-Butyl Methacrylate)

Following the procedure of Example 46, hydroxy-terminated methyl methacrylate (35%)/n-butyl methacrylate (BMA) (65%) copolymer was prepared using the following amounts of materials: [(2-methyl-1-[2-(trimethylsiloxy)ethoxy]-1-propenyl)oxy]trimethylsilane, 0.51 g (1.85 mmol); MMA, 11 ml (103.7 mmol); BMA, 30 ml (188.5 mmol); tris(dimethylamino)sulfonium bifluoride, 20 mg (0.1 mmol); THF, 100 ml. Upon addition of the monomers the temperature rose to 48.6° from 20.6°. Evaporation of solvents and drying of the resultant residue gave 38.6 g of copolymer. GPC: $\overline{M}_n$ 22100, $\overline{M}_w$ 24500, D 1.11 (theor. $\overline{M}_w$ 20,215).

EXAMPLE 48

Copolymerization of MMA/BMA Catalyzed by Cesium Bifluoride Generated in Situ

To a 3-necked 1—1 flask fitted with an argon inlet, a stirrer and a thermometer were added 61 mg (0.4 mmol) of CsF and 2.0 ml of 0.1 M THF solution of isobutyric acid. After stirring for 15 min, 300 ml of tetrahydrofuran was added and the suspension was stirred for 1 h at room temperature. Then, [(2-methyl-1-[2-(trimethylsiloxy)ethoxy]-1-propenyl)oxy]trimethylsilane (4.16 g, 15 mmol) was added. Using two syringe pumps 50.7 g (506.3 mmol) of MMA and 72 g (506.3 mmol) of n-butyl methacrylate were simultaneously added over a period of 1 h. The maximum temperature was 51°. The reaction was allowed to cool to room temperature and methanol (50 ml) was added. The mixture was then refluxed for two hours, cooled and evaporated to give 127.1 g of copolymer. GPC: $\overline{M}_n$ 12,100; $\overline{M}_w$ 25,000; D 2.06 (theor. $\overline{M}_w$ 8300).

EXAMPLE 49

Preparation of "Living" Poly(Methyl Methacrylate) and Subsequent Reactions Thereof This example demonstrates the preparation of "living" poly(methyl methacrylate) containing active terminal trimethylsiloxy groups, and subsequent reactions thereof.

A. "Living" Poly(methyl methacrylate)

To a solution of 2.6 g (9.4 mmol) of [(2-methyl-1-[2-(trimethylsiloxy)ethoxy]-1-propenyl)oxy]trimethylsilane in 10 ml of THF was added 166 mg of tris(dimethylamino)sulfonium bifluoride. Then, a solution of 10 g (100 mmol) of MMA in 10 ml of THF was added dropwise over 30 min. After the temperature dropped to 22°, the reaction mixture containing PMMA was separated into three equal parts, under argon, for use in Parts B, C and D below.

B. Reaction with Bromine and Titanium Tetrachloride

The reactions involved are shown below. In all equations, R is

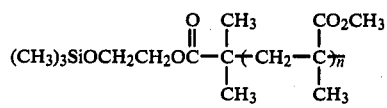

(i) Bromine reacts with approximately one-half of the living polymer in the 11.1 ml aliquot of polymerization mixture from Part A:

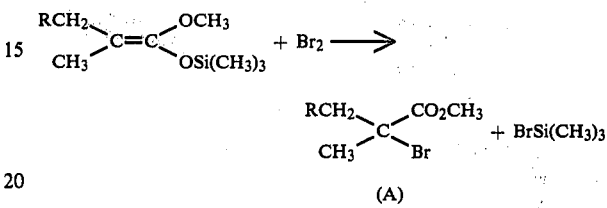

(ii) The remaining living polymer in the 11.1 ml aliquot from Part A reacts with TiCl$_4$:

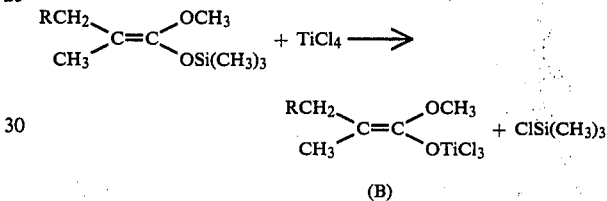

(iii) Coupling:

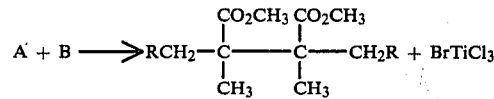

One-third of the polymerization mixture from Part A (11.1 ml) was cooled to 0° and treated with 0.3 g (1.9 mmol) of bromine in 5 ml of 1,2-dichloroethane. After the red bromine color disappeared, a solution of 0.4 ml of TiCl$_4$ in 5 ml of 1,2-dichloroethane was added, whereupon a precipitate formed. The mixture was allowed to warm to room temperature, stirred for 1 h, and then evaporated. The residue was dissolved in 20 ml of acetone and precipitated from hexane to give 4.45 g of polymer. This was identified by HPLC, NMR and GPC to be a di(trimethylsilyloxy)PMMA, hydrolyzable to dihydroxy PMMA. GPC: $\overline{M}_n$ 3600, $\overline{M}_w$ 4400, D 1.23 (theor. $\overline{M}_w$ 2392).

C. Reaction with Benzyl Bromide (Capping)

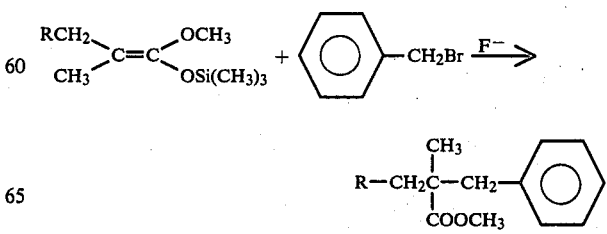

R has the same meaning as in Part B.

An aliquot (11.1 ml) of original polymerization reaction mixture from Part A was cooled to −43° under argon. To this was added 0.7 g of benzyl bromide. The solution was stirred and allowed to warm to room temperature. After stirring for 15 min 3.5 ml of a 1.0 M acetonitrile solution of tris(dimethylamino)sulfonium difluorotrimethylsilicate was added. The solution was stirred at 25° for 1½ h, after which was added 10 ml of methanol. The solvents were evaporated and the polymer was precipitated from hexane; 4.25 g of powdery solid polymer was recovered. GPC: $\overline{M}_n$ 2300, $\overline{M}_w$ 3700, D 1.61 (theor. $\overline{M}_w$ 1287).

D. Reaction with 1,4-Xylyl Bromide

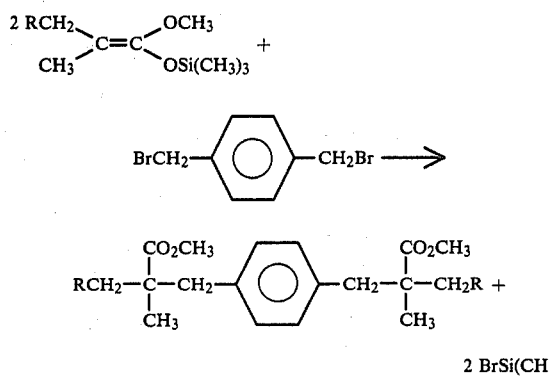

R has the same meaning as in Part B.

Following the procedure of Part B, 11.1 ml of the reaction mixture was treated with 0.5 g (1.9 mmol) of 1,4-xylyl bromide, 1.1 g of tris(dimethylamino)sulfonium difluorotrimethylsilicate to give 4.31 g of α,-maksed-dihydroxy PMMA. GPC: $\overline{M}_n$ 3400, $\overline{M}_w$ 4200, D 1.24 (theor. $\overline{M}_w$ 2494).

Best Mode For Carrying Out The Invention

The best mode presently contemplated for carrying out the invention is demonstrated by Examples 17, 22, 26, 30, 31, 35–38, 41 and 42.

Industrial Applicability

The invention process provides useful and well known polymers containing functional substituents, for example, homopolymers and copolymers of acrylate and/or methacrylate monomers, such polymers heretofore being made usually bey anionic polymerization techniques. The invention process also provides a means for making certain commercially desirable, relatively monodisperse copolymers of methacrylate and acrylate comonomers, such copolymers being difficult or impossible to obtain by known processes such as anionic polymerization or free-radical polymerization. The invention process also provides "living" polymer which may be cast or spun, for example, into a film or fiber, from solution (in an aprotic solvent) or isolated, processed, and then further polymerized.

Although preferred embodiments of the invention have been illustrated and described hereinabove, it is to be understood that there is no intent to limit the invention to the precise constructions herein disclosed, and it is to be further understood that the right is reserved to all changes and modifications coming within the scope of the invention as defined in the appended claims.

What is claimed is:

1. Process of polymerizing the monomer selected from the group consisting of

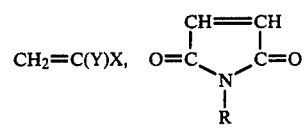

and mixtures thereof
wherein:
X is —CN, —CH=CHC(O)X' or —C(O)X';
Y is —H, —CH₃, —CN or —CO₂R, provided, however, when X is CH=CHC(O)X', Y is —H or —CH₃;
X' is —OSi(R¹)₃, —R, —OR or —NR'R";
each R¹ is independently selected from $C_{1-10}$ alkyl and $C_{6-10}$ aryl or alkaryl;
R is $C_{1-20}$ alkyl, alkenyl, or alkadienyl; $C_{6-20}$ cycloalkyl, aryl, alkaryl or aralkyl; any of said groups containing one or more ether oxygen atoms within aliphatic segments thereof; and any of all the aforesaid groups containing one or more functional substituents that are unreactive under polymerizing conditions; and
each of R' and R" is independently selected from $C_{1-4}$ alkyl
by contacting the one or more monomers under polymerizing conditions with:
(i) the initiator of the formula (R¹)₃MZ wherein:
R¹ is as defined above;
Z is an activating substituent selected from the group consisting of

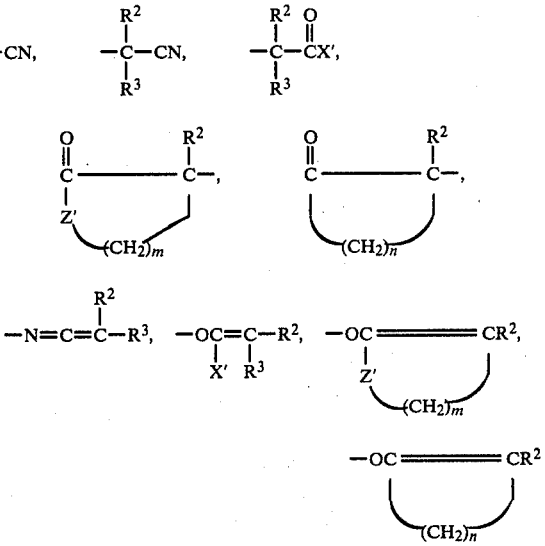

and mixtures thereof wherein:
X' is as defined above;
each of R² and R³ is independently selected from H; $C_{1-10}$ alkyl and alkenyl; $C_{6-10}$ aryl, alkaryl, and aralkyl; any of said groups except H containing one or more ether oxygen atoms within aliphatic segments thereof; and any of all the aforesaid groups except H containing one or more functional substituents that are unreactive under polymerizing conditions; and
Z' is O or N;
m is 2, 3 or 4;
n is 3, 4 or 5; and M is Si, Sn, or Ge, provided, however, when Z is

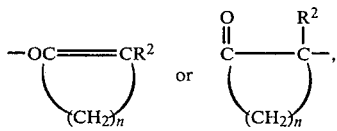

M is Sn or Ge; and (ii) a co-catalyst which is a source of fluoride, cyanide or azide ions or a suitable Lewis acid, to produce "living" polymer having repeat units of the one or more monomers.

2. Process of claim 1 wherein at least one of said R, $R^2$ and $R^3$ groups contains one or more ether oxygen atoms within any aliphatic segment thereof.

3. Process of claim 1 wherein at least one of said R, $R^2$ and $R^3$ groups contains at least one functional substituent that is unreactive under polymerizing conditions.

4. Process of claim 1 wherein the monomer is $CH_2=C(Y)X$, M is Si, and the co-catalyst is a source of fluoride or cyanide ions, $ZnI_2$, $ZnBr_2$ or $ZnCl_2$.

5. Process of claim 4 wherein X is —C(O)X'.

6. Process of claim 5 wherein Y is —H or —$CH_3$.

7. Process of claim 6 wherein X' is —OR.

8. Process of claim 7 wherein R is substituted with at least one —OSi($R^1$)$_3$ or —C(O)OR group.

9. Process of claim 7 wherein R is substituted with at least one —OC(R)(R)OR, —OC(H)(R)OR or

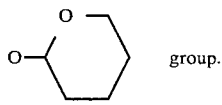

group.

10. Process of claim 7 wherein R is substituted with oxiranyl.

11. Process of claim 7 wherein R is $C_{1-20}$ alkyl, sorbyl, 2-methacryloxyethyl, 2-[(1-propenyl)oxy]ethyl, allyl, 2-(dimethylamino)ethyl or amino.

12. Process of claim 4 wherein X is —CN.

13. Process of claim 4 wherein X is —CN.

14. Process of claim 4 wherein Z is —C($R^2$)($R^3$)CN.

15. Process of claim 14 wherein at least one of $R^2$ and $R^3$ is —H.

16. Process of claim 4 wherein Z is —C($R^2$)($R^3$)—C(O)X' or —OCX'=C($R^2$)($R^3$).

17. Process of claim 16 wherein at least one of $R^2$ and $R^3$ is H.

18. Process of claim 16 wherein $R^2$ and $R^3$ are $CH_3$.

19. Process of claim 18 wherein X' in the initiator is —OSi($CH_3$)$_3$.

20. Process of claim 18 wherein X' in the initiator is —$OCH_3$.

21. Process of claim 5 wherein Z is

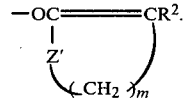

22. Process of claim 21 wherein Z' is oxygen, $R^2$ is H and m is 2.

23. Process of claim 19 wherein at least one of $R^2$ and $R^3$ is substituted with at least one functional group that is unreactive under polymerizing conditions.

24. Process of claim 20 wherein at least one of $R^2$ and $R^3$ is substituted with at least one functional group that is unreactive under polymerizing conditions.

25. Process of claim 1 wherein $R^1$ is —$CH_3$.

26. Process of claim 25 wherein Z is —CN.

27. Process of claim 1 carried out at about $-100°$ C. to about $150°$ C.

28. Process of claim 27 carried out at $0°$ C. to $50°$ C.

29. "Living" polymer of the formula:

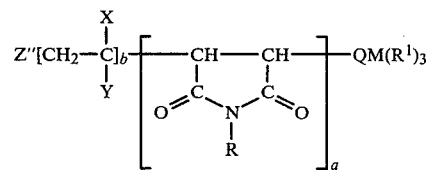

wherein:

Z" is selected from the group consisting of

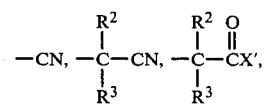

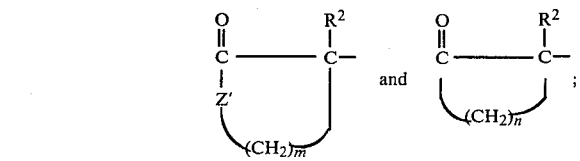

each of a and b is independently selected from 0 or a number in the range 1 to about 100,000, provided, however, (a+b) is at least 3;

Q is the divalent radical selected from the group consisting of

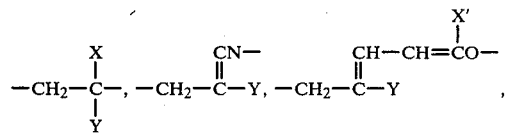

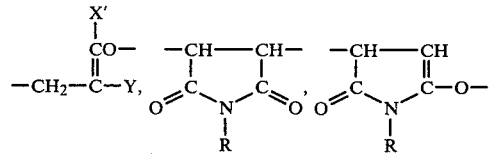

and mixtures thereof;

X is —CN, —CH=CHC(O)X' or —C(O)X';

Y is —H, —$CH_3$, —CN or —$CO_2$R, provided, however, when X is —CH=CHC(O)X', Y is —H or —$CH_3$;

X' is —OSi($R^1$)$_3$, —R, —OR or —NR'R";

each $R^1$ is independently selected from $C_{1-10}$ alkyl and $C_{6-10}$ aryl or alkaryl;

R is $C_{1-20}$ alkyl, alkenyl, or alkadienyl or $C_{6-20}$ cycloalkyl, aryl, alkaryl or aralkyl, any of said groups optionally containing one or more ether oxygen atoms within aliphatic segments thereof and optionally containing one or more functional substituents that are unreactive under polymerizing conditions; and each of R' and R" is independently selected from $C_{1-4}$ alkyl;

each of $R^2$ and $R^3$ is independently selected from H; $C_{1-10}$ alkyl and alkenyl; and $C_{6-10}$ aryl, alkaryl, and aralkyl, any of said groups except H optionally containing one or more ether oxygen atoms within aliphatic segments thereof and optionally containing one or more functional substituents;

Z' is O or N;

m is 2, 3 or 4;

n is 3, 4 or 5; and

M is Si, Sn, or Ge.

30. Polymer of claim 29 wherein at least one of said R, $R^2$ and $R^3$ groups contains one or more ether oxygen atoms within any aliphatic segment thereof.

31. Polymer of claim 29 wherein at least one of said R, $R^2$ and $R^3$ groups contains at least one functional substituent that is unreactive under polymerizing conditions.

32. Polymer of claim 29 wherein a is O and M is Si.

33. Polymer of claim 32 wherein X is —C(O)X'.

34. Polymer of claim 33 wherein Y is —H or —CH$_3$.

35. Polymer of claim 34 wherein X' is —OR.

36. Polymer of claim 35 wherein R is substituted with at least one —OSi(R$^1$)$_3$ or —C(O)OR group.

37. Polymer of claim 35 wherein R is substituted with at least one —OC(R)(R)OR, —OC(H)(R)OR or

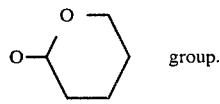 group.

38. Polymer of claim 35 wherein R is substituted with oxiranyl.

39. Polymer of claim 35 wherein R is $C_{1-20}$ alkyl, sorbyl, 2-methacryloxyethyl, 2-[(1-propenyl)oxy]ethyl, allyl, 2-(dimethylamino)ethyl or amino.

40. Polymer of claim 32 wherein X is —CN.

41. Polymer of claim 32 wherein Z" is —CN.

42. Polymer of claim 32 wherein Z" is —C(R$^2$)(R$^3$)CN.

43. Polymer of claim 42 wherein at least one of $R^2$ and $R^3$ is —H.

44. Polymer of claim 32 wherein Z" is —C(R$^2$)(R$^3$)—C(O)X'.

45. Polymer of claim 44 wherein at least one of $R^2$ and $R^3$ is H.

46. Polymer of claim 44 wherein $R^2$ and $R^3$ are CH$_3$.

47. Polymer of claim 46 wherein X' in Z" is —OSi(CH$_3$)$_3$.

48. Polymer of claim 46 wherein X' in Z" is —OCH$_3$.

49. Polymer of claim 33 wherein Z" is

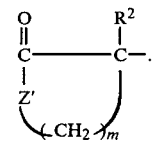

50. Polymer of claim 49 wherein Z' is oxygen, $R^2$ is H and m is 2.

51. Polymer of claim 47 wherein at least one of $R^2$ and $R^3$ is substituted with at least one functional group that is unreactive under polymerizing conditions.

52. Polymer of claim 48 wherein at least one of $R^2$ and $R^3$ is substituted with at least one functional group that is unreactive under polymerizing conditions.

53. Polymer of claim 29 wherein $R^1$ is —CH$_3$.

54. Polymer of claim 53 wherein Z" is —CN.

55. Solution of the polymer of claim 29 dissolved in an aprotic solvent.

56. Film of the polymer of claim 29, prepared from the solution of claim 55.

57. Fiber of the polymer of claim 29, prepared from the solution of claim 55.

* * * * *